US009348500B2

(12) United States Patent
Icho et al.

(10) Patent No.: US 9,348,500 B2
(45) Date of Patent: May 24, 2016

(54) CATEGORIZING APPARATUS AND CATEGORIZING METHOD

(75) Inventors: Keiji Icho, Osaka (JP); Ryouichi Kawanishi, Kyoto (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 282 days.

(21) Appl. No.: 13/806,100

(22) PCT Filed: Apr. 20, 2012

(86) PCT No.: PCT/JP2012/002738
§ 371 (c)(1),
(2), (4) Date: Dec. 20, 2012

(87) PCT Pub. No.: WO2012/144225
PCT Pub. Date: Oct. 26, 2012

(65) Prior Publication Data
US 2013/0097542 A1 Apr. 18, 2013

Related U.S. Application Data

(63) Continuation of application No. 13/091,620, filed on Apr. 21, 2011, now abandoned.

(51) Int. Cl.
*G06F 3/0486* (2013.01)
*G06F 17/30* (2006.01)
*G06T 11/60* (2006.01)

(52) U.S. Cl.
CPC ........ *G06F 3/0486* (2013.01); *G06F 17/30032* (2013.01); *G06F 17/30056* (2013.01); *G06T 11/60* (2013.01)

(58) Field of Classification Search
CPC ... G06F 3/0486; G06F 3/0481; G06F 9/4443; G06F 17/24; G06F 9/543
USPC .......................................................... 715/769
See application file for complete search history.

(56) References Cited

U.S. PATENT DOCUMENTS 5,386,505 A * 1/1995 Beattie ..................... G09G 5/14
345/629
5,754,179 A 5/1998 Hocker et al.
(Continued)

FOREIGN PATENT DOCUMENTS

JP    09-288556 A    11/1997
JP    2007-034663 A    2/2007
(Continued)

*Primary Examiner* — Weilun Lo
*Assistant Examiner* — Jung-Mu Chuang
(74) *Attorney, Agent, or Firm* — Harness, Dickey & Pierce, P.L.C.

(57) ABSTRACT

A categorizing apparatus according to the present invention includes: a selected object position determining unit which determines a first position of an object selected by a user in a first region; an identifying unit which identifies one or more objects which are related to the selected object; a parameter assigning unit which assigns a parameter to each of the related objects according to a degree of relatedness between each of the related objects and the selected object, the parameter contributing to a predetermined relationship which defines tracking property of the related object to the selected object when the selected object is moved from the first position. Hence the categorizing apparatus allows the user to intuitively categorize content items through his or her operation, so that the content items are categorized as the user desires.

18 Claims, 22 Drawing Sheets

(56) References Cited

U.S. PATENT DOCUMENTS

| | | | |
|---|---|---|---|
| 6,002,401 A * | 12/1999 | Baker | G06F 17/30067 345/473 |
| 6,188,405 B1 * | 2/2001 | Czerwinski et al. | 715/764 |
| 6,594,673 B1 * | 7/2003 | Smith et al. | 1/1 |
| 6,880,171 B1 * | 4/2005 | Ahmad et al. | 725/134 |
| 7,028,050 B1 * | 4/2006 | Rose | 1/1 |
| 7,139,421 B1 * | 11/2006 | Fix et al. | 382/141 |
| 7,308,140 B2 * | 12/2007 | Shin et al. | 382/209 |
| 7,509,588 B2 | 3/2009 | Van Os et al. | |
| 7,542,951 B1 | 6/2009 | Chakrabarti et al. | |
| 7,752,184 B2 * | 7/2010 | Kagawa | 707/702 |
| 7,925,985 B2 * | 4/2011 | Moore | 715/772 |
| 8,031,914 B2 * | 10/2011 | Zhang | 382/118 |
| 8,175,376 B2 * | 5/2012 | Marchesotti et al. | 382/159 |
| 8,220,022 B1 | 7/2012 | Pan et al. | |
| 8,234,581 B2 | 7/2012 | Kake | |
| 8,312,049 B2 * | 11/2012 | Chayes et al. | 707/793 |
| 8,577,887 B2 * | 11/2013 | Joshi et al. | 707/738 |
| 8,600,920 B2 * | 12/2013 | Flynn et al. | 706/45 |
| 8,774,498 B2 * | 7/2014 | de Campos et al. | 382/155 |
| 2002/0033848 A1 | 3/2002 | Sciammarella et al. | |
| 2002/0075322 A1 | 6/2002 | Rosenzweig et al. | |
| 2002/0080180 A1 | 6/2002 | Mander et al. | |
| 2002/0131641 A1 * | 9/2002 | Luo et al. | 382/218 |
| 2003/0007017 A1 | 1/2003 | Laffey et al. | |
| 2003/0064757 A1 * | 4/2003 | Yamadera | G06F 3/0482 455/566 |
| 2003/0160824 A1 * | 8/2003 | Szumla | 345/769 |
| 2003/0195883 A1 * | 10/2003 | Mojsilovic et al. | 707/6 |
| 2004/0090460 A1 * | 5/2004 | Kawahara | 345/764 |
| 2004/0150664 A1 | 8/2004 | Baudisch | |
| 2004/0177319 A1 * | 9/2004 | Horn | 715/501.1 |
| 2004/0189707 A1 | 9/2004 | Moore et al. | |
| 2004/0201702 A1 | 10/2004 | White | |
| 2005/0044100 A1 | 2/2005 | Hooper et al. | |
| 2006/0161867 A1 | 7/2006 | Drucker et al. | |
| 2006/0190817 A1 | 8/2006 | Banks | |
| 2006/0242139 A1 | 10/2006 | Butterfield et al. | |
| 2006/0242178 A1 * | 10/2006 | Butterfield et al. | 707/100 |
| 2007/0027855 A1 * | 2/2007 | Kagawa | 707/3 |
| 2007/0100798 A1 * | 5/2007 | Kapur | 707/3 |
| 2007/0271524 A1 | 11/2007 | Chiu et al. | |
| 2008/0077583 A1 * | 3/2008 | Castro et al. | 707/5 |
| 2008/0077874 A1 | 3/2008 | Garbow et al. | |
| 2008/0089591 A1 | 4/2008 | Zhou et al. | |
| 2008/0104536 A1 | 5/2008 | Mori | |
| 2008/0152297 A1 * | 6/2008 | Ubillos | 386/52 |
| 2008/0222199 A1 * | 9/2008 | Tiu et al. | 707/104.1 |
| 2008/0225153 A1 * | 9/2008 | Fagans | 348/333.01 |
| 2008/0229222 A1 | 9/2008 | Kake | |
| 2008/0235628 A1 | 9/2008 | Faught | |
| 2008/0307330 A1 * | 12/2008 | Louch et al. | 715/763 |
| 2008/0307335 A1 | 12/2008 | Chaudhri et al. | |
| 2008/0307359 A1 | 12/2008 | Louch et al. | |
| 2009/0080698 A1 * | 3/2009 | Mihara et al. | 382/103 |
| 2009/0171783 A1 * | 7/2009 | Raju | 705/14 |
| 2009/0204915 A1 * | 8/2009 | Yamagami | G06F 9/4443 715/764 |
| 2009/0228830 A1 * | 9/2009 | Herz et al. | 715/808 |
| 2009/0307623 A1 * | 12/2009 | Agarawala | G06F 3/0483 715/765 |
| 2010/0057696 A1 * | 3/2010 | Miyazawa et al. | 707/3 |
| 2010/0083111 A1 * | 4/2010 | de los Reyes | 715/702 |
| 2010/0114881 A1 * | 5/2010 | Christian et al. | 707/723 |
| 2010/0161621 A1 * | 6/2010 | Peters | 707/749 |
| 2010/0333025 A1 | 12/2010 | Roberts | |
| 2010/0333140 A1 * | 12/2010 | Onodera et al. | 725/44 |
| 2011/0029904 A1 * | 2/2011 | Smith et al. | 715/765 |
| 2011/0055773 A1 * | 3/2011 | Agarawala et al. | 715/863 |
| 2011/0129145 A1 * | 6/2011 | Perlmutter et al. | 382/159 |
| 2012/0036480 A1 * | 2/2012 | Warner et al. | 715/833 |
| 2012/0041779 A1 * | 2/2012 | Boroczky et al. | 705/2 |

FOREIGN PATENT DOCUMENTS

| | | |
|---|---|---|
| JP | 2008-234055 A | 10/2008 |
| JP | 2009-087057 A | 4/2009 |

* cited by examiner

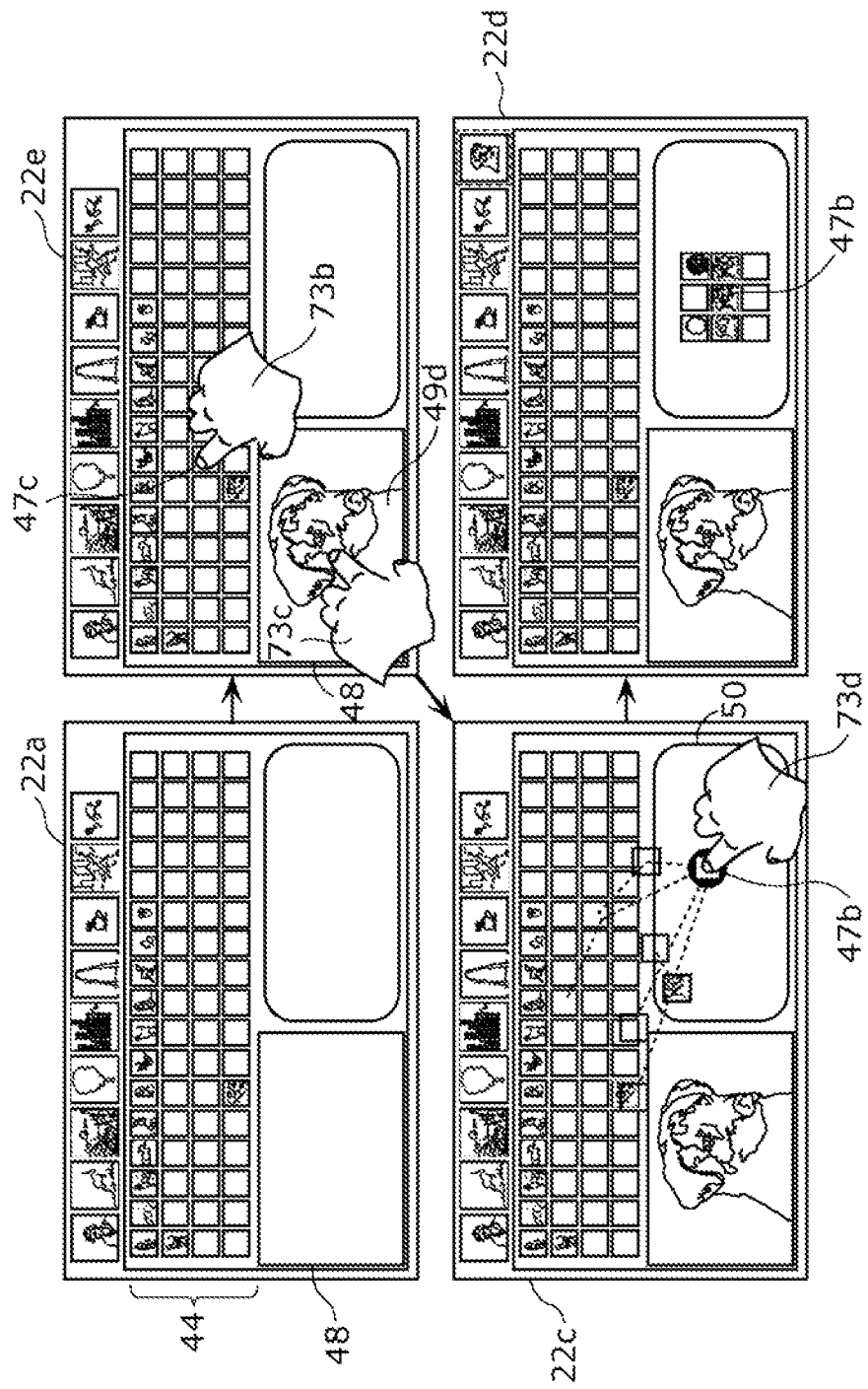

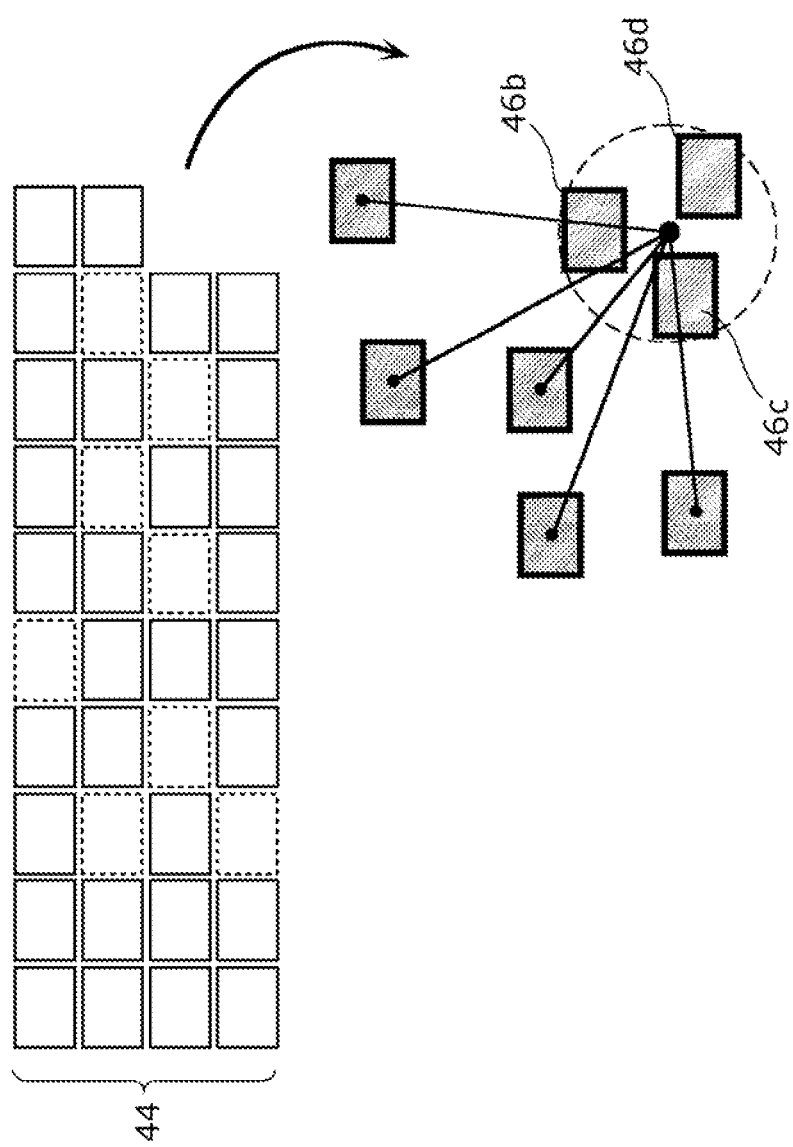

CATEGORIZING APPARATUS AND CATEGORIZING METHOD

TECHNICAL FIELD

The present invention relates to categorizing apparatuses and categorizing methods and, in particular, to a categorizing apparatus and a categorizing method to allow a user to intuitively reorganize digital content, including computerized images, data, and icons.

BACKGROUND ART

Digital content can take many forms, such as computerized images, data, and icons. Recently a user owns a large number of digital content items, and it is troublesome for the user to categorize the digital content items as desired. One of the proposed techniques to categorize digital content items is an automatic one based on, for example, facial recognition, object recognition, or feature amount (See PTL 1, for example).

CITATION LIST

Patent Literature

[PTL 1] United States Patent Application Publication 2008/0089591

SUMMARY OF INVENTION

Technical Problem

The automatic categorization technique disclosed in the above patent literature 1, however, cannot obtain a categorizing result which meets each user's styles and preference. In order to obtain such a categorizing result to meet the user's characteristics and preference, the automatically categorized digital content items need to be re-edited one by one in a manner that, for example, every single digital content item has to be re-mapped. This problem makes the technique less useful for the user.

The present invention is conceived in view of the above problem and aims to provide a categorizing apparatus and a categorizing method to allow the user to intuitively categorize digital content items through his or her operation, so that the digital content items are categorized as the user desires.

Solution to Problem

In order to achieve the above aim, a categorizing apparatus according to an aspect of the present invention includes: a position determining unit which determines a first position of an object selected by a user, in a first region, from among objects arranged in the first region on a display screen; an identifying unit which identifies, among the objects, one or more objects which are related to the selected object; and a parameter assigning unit which assigns a parameter to each of related objects, including the related object, according to a degree of relatedness between each of the one or more related objects and the selected object, the parameter contributing to a predetermined relationship which defines tracking property of the related object to the selected object when the selected object is moved from the first position.

It is noted that the entire or the specific aspect of the present invention may be implemented in a form of a system, a method, an integrated circuit, a computer program, or a storage medium, or may be implemented in a form of any given combination thereof.

Advantageous Effects of Invention

The present invention successfully implements a categorizing apparatus and a categorizing method to allow the user to intuitively categorize digital content items through his or her operation, so that the digital content items are categorized as the user desires.

BRIEF DESCRIPTION OF DRAWINGS

FIG. 13 exemplifies how to create a new category group on the display screen provided by the categorizing apparatus according to the embodiment.

FIG. 19 shows following motion processing executed by the categorizing apparatus in Modification 2 according to the embodiment.

DESCRIPTION OF EMBODIMENT

Figure 1:
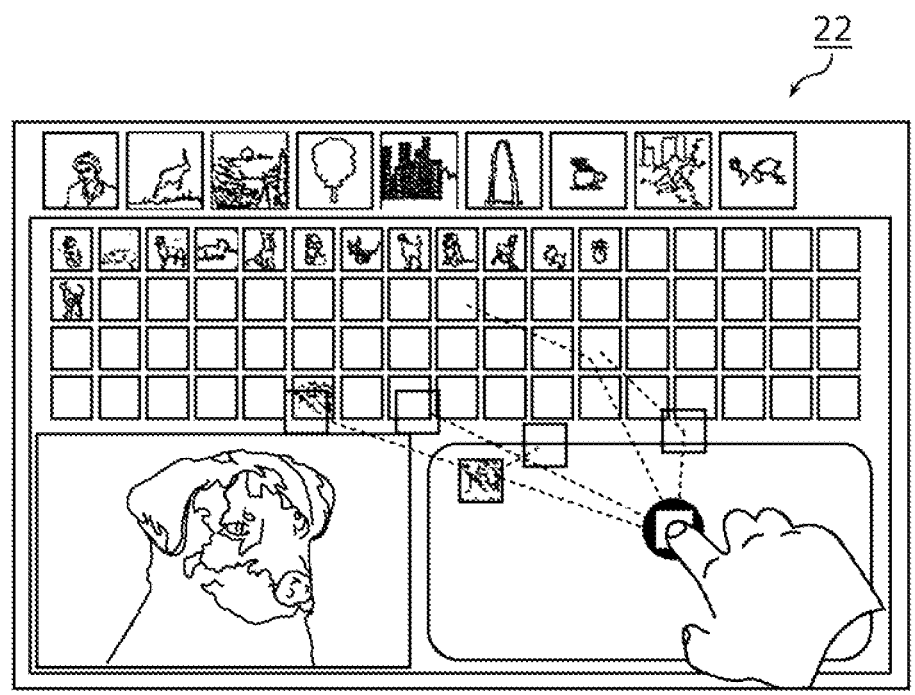
FIG. 1 exemplifies a display screen according to an embodiment.

Introduction to an Embodiment of the Present Invention

Typical digital content includes photographic data, video data, and text data. The photographic data, for example, is typically stored as raw image data or as compressed image data (e.g. JPEG format). The video data, for example, is typically stored as a collection of image frames encoded using a suitable CODEC (e.g. MPEG format). The text data, for example, is stored as generic text files, as application-specific files (e.g. Microsoft Word doc or docx format), or as printable files (e.g. PDF). Some digital content items include both the text data and the image data. Such digital content items include files for presentation software applications (e.g. Microsoft PowerPoint). Some database applications typically store, as digital content, not only text and numeric data but also image data according to a predetermined data structure that assigns meaning to the stored data. Such applications can organize and edit icons as digital content items. Some of the database applications can store the icons as image data and with additional metadata.

When a user desires to categorize (organize) the above digital content items, the process has been tedious and far from intuitive. In addition, categorizing techniques implemented by conventional software require the user to interact with complex system menus, dialog boxes, or commands to make a desired digital content selection. Furthermore, when the digital content items include non-text items, such as photographs, images, and movies, the interaction is more complex since the text searching technique is not highly effective and thus the software cannot automatically categorize the non-text digital content items.

Moreover, in the case where the digital content data store is large, such as a large collection of stored photographic images, the task of categorizing digital content items can be quite daunting.

There are some tools (techniques) to automatically categorize digital content items, such as the one disclosed in the patent literature 1, for example. The user could use those tools to categorize digital content items, such as images, based on image characteristic extraction, and face/object recognition.

These tools (conventional automatic categorization techniques), however, often retrieve too many hits, many of which the user must then manually reject. In addition, the automatic categorization technique disclosed in the patent literature 1, cannot obtain a categorizing result which meets each user's characteristics and preference. In order to obtain such a categorizing result, the automatically categorized digital content items need to be re-edited one by one in a manner that, for example, every single digital content item has to be re-mapped.

This problem makes the technique less useful for the user.

An aspect of the present invention is conceived in view of the above problem and has an object to implement a categorizing apparatus and a categorizing method to allow the user to intuitively categorize digital content items through his or her operation, so that the digital content items are categorized as the user desires.

In order to solve the above problems, a categorizing apparatus according to an implementation of the present invention includes: a position determining unit which determines a first position of an object selected by a user, in a first region, from among objects arranged in the first region on a display screen; an identifying unit which identifies, among the objects, one or more objects which are related to the selected object; and a parameter assigning unit which assigns a parameter to each of related objects, including the related object, according to a degree of relatedness between each of the one or more related objects and the selected object, the parameter contributing to a predetermined relationship which defines tracking property of the related object to the selected object when the selected object is moved from the first position.

Hence the above feature successfully implements the categorizing apparatus which allows the user to intuitively categorize digital content items through his or her operation, so that the digital content items are categorized as the user desires.

Here, for example, the categorizing apparatus further includes a following motion processing unit which, when the user moves the selected object from the first position to a second position, causes the one or more related objects to follow the selected object and move each of the related objects to a position nearby the second position based on the predetermined relationship, the second position being included in a second region that differs from the first region on the display screen.

For example, the predetermined relationship may be a function which defines at least one of position, velocity, and acceleration.

The predetermined relationship may define, as the tracking property, an algorithm for simulating, according to the degree of relatedness, behavior of an attractive force which acts between the selected object and each of the related objects.

The predetermined relationship may define, as the tracking property, an algorithm for simulating, according to the degree of relatedness, behavior of a spring force which pulls each of the related objects towards the selected object.

For example, the predetermined relationship may further define, as the tracking property, an algorithm for simulating a frictional force which retards, according to the degree of relatedness, the behavior effected by the spring force.

For example, the following motion processing unit may move the related object to the position nearby the second position which is away from the related object according to the degree of relatedness.

For example, the degree of relatedness may be a degree of similarity between the selected object and the related object.

For example, the categorizing apparatus may include a connecting line generating unit which generates a connecting line between the selected object and each of the related objects, and display, based on the degree of relatedness, the generated connecting line in a visible form on the display screen.

For example, the parameter assigning unit may assign the parameter, which contributes to the predetermined relationship, only to a related object which is included in the related objects and has a first degree of relatedness or higher, according to the degree of relatedness between the selected object and each of the related objects.

For example, the following motion processing unit may further include: a rotation detecting unit which detects rotation applied to the selected object that the user moves from the first position to the second position; and a moving unit which, in the case where a magnitude of an angular velocity of the rotation detected by the rotations detecting unit is greater than or equal to a first threshold, return, to an original place in the first region, a related object which is included in the related objects and whose degree of relatedness is lower than or equal to the first degree of relatedness.

For example, the following motion processing unit may further include: a velocity detecting unit which detects a velocity of the selected object when the user moves the selected object from the first position to the second position; and a moving unit which, in the case where a magnitude of the velocity detected by the velocity detecting unit is greater than or equal to a first threshold, returns, to an original place in the first region, a related object which is included in the related objects and whose degree of relatedness is equal to or smaller than the first degree of relatedness.

For example, the categorizing apparatus may further include: a display control unit configured to display, on a third region, an object which is designated by the user from among the objects arranged in the first region, the third region being different from the first region and the second region; a feature part detecting unit which detects a first feature part that is designated by the user from among feature parts that form the designated object displayed in the third area; and a presenting unit configured to present a feature related object which is identified by the identifying unit among the objects, and has a relation to the first feature part, wherein the position determining unit is configured to determine a first position of a feature related object selected by the user, in the first region, from among feature related objects including the feature related object, the feature related object being selected as the selected object.

For example, the selected object may include two or more of the objects, and the identifying unit may identify, as the related objects, objects which are related to one of the two or more of the objects that has an average feature among features of the two or more of the objects.

For example, the categorizing apparatus may include an additional information assigning unit which receives additional information to be inputted from the user to a group organized with the selected object at the second position and the related objects at the positions nearby the selected object, and to assign the received additional information to the organized group.

For example, the identifying unit may identify, among the objects, a first related object and a second related object as the related objects, the first related object relating to the selected object and the second related object relating to the first related object.

Here the objects may be icons to start up application, for example.

The objects may be content items, for example.

Moreover, in order to solve the above problems, a categorizing method according to an implementation of the present invention includes: determining a first position of an object selected by a user, in a first region, from among objects arranged in the first region on a display screen; identifying, among the objects, one or more objects which are related to the selected object; and assigning a parameter to each of related objects, including the related object, according to a degree of relatedness between each of the one or more related objects and the selected object, the parameter contributing to a predetermined relationship which defines tracking property of the related object to the selected object when the selected object is moved from the first position.

It is noted that the embodiment below is a specific example of the present invention. The numerical values, shapes, materials, constitutional elements, arrangement positions and connecting schemes of the constitutional elements, steps, and an order of steps all described in the embodiment are examples, and shall not be defined as they are. Hence, among the constitutional elements in the embodiment, those not described in an independent claim representing the most generic concept of the present invention are introduced as optional ones.

Moreover, the drawings in the Description shall be used only to exemplify the embodiment, and thus the drawings shall not limit the scope of the present disclosure. The same reference numerals that are shared among the illustrations in the drawings shows a corresponding part.

Embodiment

The categorizing apparatus and the categorizing method according to the embodiment associates (i) a related object with (ii) a computer-generated parameter which defines tracking property based on a degree of relatedness between a target digital content item (selected object) and other related digital content items (related objects), so that the apparatus and the method allow a user to categorize and reorganize digital content items (objects), such as images and icons, in a user-friendly and natural manner in associating.

Furthermore, the categorizing apparatus and the categorizing method according to the embodiment assigns the above parameter to the related digital content items so that, for example, the related digital content items have physically kinematic properties which can be simulated by a computer, according to the degree of relatedness for the related digital content items. Here, for example, the user is to select a desired target digital content item in a computer-generated image space, such as a display screen, using a suitable touch gesture or a pointing device. In doing so, the related digital content items are depicted in the computer-generated image space, such as a display screen, as movable objects (physical objects) which follow the target digital content item and show physical kinematic properties. Specifically, the related digital content items are depicted in moving as if being attracted to the selected target digital content item by an invisible attractive force (e.g., invisible spring force or physical force such as gravity).

Hence when the user, for example, drags a target digital content item selected in the image space such as a display screen, the related digital content items are depicted to follow the selected target digital content item, exhibiting kinematic motions as if they were moved by invisible attractive force.

It is noted that the level of the invisible attractive force is defined according to the degree of relatedness between the target digital content item and the related digital content items. In other words, a related digital content item having a higher degree of relatedness is defined to be attracted with stronger force than a related digital content item having a lower degree of relatedness.

Moreover, the level of the invisible attractive force may be defined to be reflected in a velocity at which the related digital content items follow the target digital content item. In other words, a related digital content item having a higher degree of relatedness may be defined to follow the selected target digital content item faster.

Since the invisible attractive force is defined as described above, a related digital content item having a higher degree of relatedness comes closer to the target digital content item than a related digital content item having a lower degree of interest.

Hence the user intuitively recognizes the degree of relatedness between a related digital content item and the target digital content item by observing the behavior of the related digital content item which is following the target digital content item and the position where the related digital content item is rendered.

Moreover, when the user moves the target digital content item in the computer-generated image space, the related digital content item moves as if tracing the behavior of a physical object. Thus the user can learn quickly and spontaneously how to reorganize the related digital content items, since the user can reorganize the related digital content items by simply moving the target digital content item by touch and drag (or click and drag).

It is noted that the parameter that defines tracking property is typically a kind of physical parameter to represent the degree of relatedness between the target digital content item and a digital content item related to the target digital content item. The examples of such a physical parameter include but are not limited to the following (a) to (d):

(a) A force, such as at least one of tensile force and attractive force, acting between a related digital content item (related object) and the target digital content item (selected object);

(b) A velocity at which a related digital content item (related object) comes closer to the target digital content item (selected object);

(c) The final relative position of a related digital content item (related object) with respect to the target digital content item (selected object); and (d) Combination of (a) to (d).

Furthermore, the parameter which defines tracking property shall not be limited to the physical parameter. Any form of parameter may be used as far as the parameter can define a behavior showing tracking property of a related digital content item—that is the behavior of the physical object—when the target digital content item moves.

Specifically described hereinafter is the embodiment with reference to the drawings.

The degree of relatedness between the selected object (target digital content item) and a related object (related digital content item) is defined, using a parameter which defines tracking property. Described hereinafter is the case where a kinematics-related physical parameter, such as a force, a velocity, and a relative position, is used to define the tracking property.

Detailed first is how to define, using a physical parameter, a tensile force and an attractive force acting between a related object and the selected object. Such forces are, for example, generated (simulated) by a computer according to the following relationship defined in Expression 1:

[Math. 1]

$$\vec{F} = k_i(\vec{x}_i - \vec{x}_T) \quad \text{Expression 1}$$

Here a force acting between the related object i and the selected object T is represented as follows:

[Math. 2]

$$\vec{F}$$

Furthermore, $k_i$ is a parameter which depends on the relationship (degree of relatedness) between the related object i and the selected object T ($k_i > 0$). The following Math. 3 represents the position of the related object i:

[Math. 3]

$$\vec{x}_i$$

The following Math. 4 represents the position of the selected object T:

[Math. 4]

$$\vec{x}_T$$

Described next is how to define a velocity at which the related object is attracted to the selected object, using a physical parameter. Such a velocity is, for example, generated (simulated) by a computer according to the following relationship defined in Expression 2:

[Math. 5]

$$\vec{x}_i(t) = \vec{x}_i(t - \Delta t) + \frac{\vec{x}_i(t - \Delta t) - \vec{x}_T(t - \Delta t)}{l_i} \quad \text{Expression 2}$$

Here the following Math. 6 represents a position of the related object i at a time t.

[Math. 6]

$$\vec{x}_i(t)$$

The following Math. 7 represents the position of the selected object T:

[Math. 7]

$$\vec{x}_T(t)$$

Here $I_i$ is a parameter which depends on the relationship (degree of relatedness) between the related object i and the selected object T($I_i > 1$).

Then, as another example, described is how to define the final position (relative position) of a related object with respect to the selected object, using a physical parameter. Such a relative position is generated by a computer according to the following relationship defined, for example, by Expression 3:

[Math. 8]

$$\vec{r}_i = \vec{x}_{i,FINAL} - \vec{x}_{T,FINAL} \quad \text{Expression 3}$$

Here the following Math. 9 represents the final relative position of the related object i:

[Math. 9]

$$\vec{r}_i$$

Moreover Expression 3 is set depending on the relationship (degree of relatedness) between the related object i and the selected object T. When the selected object T is moved, for example, the related objects i are each moved to a corresponding one of final relative positions assigned in the descending order of the degrees of relatedness given to the selected object T. The exemplary positional ordering around the selected object T is numbered as shown in Tables 1 and 2:

TABLE 1

| 11 | 12 | 13 | 14 | 15 |
|----|----|----|----|----|
| 10 | 2  | 3  | 4  | 16 |
| 9  | 1  | T  | 5  | 17 |
| 24 | 8  | 7  | 6  | 18 |
| 23 | 22 | 21 | 20 | 19 |

TABLE 2

| 21 | 14 | 10 | 15 | 22 |
|----|----|----|----|----|
| 13 | 5  | 2  | 6  | 16 |
| 9  | 1  | T  | 3  | 11 |
| 20 | 8  | 4  | 7  | 17 |
| 24 | 19 | 12 | 18 | 23 |

It is noted that, as a matter of course, the arrangements of the objects shall not be limited to the examples in Tables 1 and 2. The objects may also be linearly arranged in a predetermined region of the screen. The selected object may be placed at the head of the line, followed by the related objects in the descending order of the degrees of relatedness. In addition, the related objects may be disposed around the selected object, so that the distance between the selected object and each of the related objects may vary depending on the levels of the degrees of relatedness.

Here a position is defined as follows:

[Math. 10]

$$\vec{x}_T + \vec{r}_i$$

The velocity at which a relative object comes closer to the position can be calculated by, for example, the following Expression 4:

[Math. 11]

$$\vec{x}_i(t) = \vec{x}_i(t - \Delta t) + \frac{\vec{x}_i(t - \Delta t) - \{\vec{x}_T(t - \Delta t) + \vec{r}_i\}}{l} \quad \text{Expression 4}$$

Here the following Math. 12 represents a position of the related object i at the time t:

[Math. 12]

$$\vec{x}_i(t)$$

The following Math. 13 represents the position of the selected object T, and the above l is a constant parameter (l>1):

[Math. 13]

$$\vec{x}_T(t)$$

Then, as another example, the degree of relatedness between a related object and the selected object may be defined, using a physical parameter composed of a combination of (i) a tensile force and an attractive force acting between the related object and the selected object and (ii) the final position (relative position) of the related object with respect to the selected object.

Here the related object comes closer to the following position:

[Math. 14]

Position $\vec{x}_T + \vec{r}_i$

Here the following position is set according to the relatedness between the related object i and the selected object T:

[Math. 15]

$$\vec{r}_i$$

Thus suppose a force acts between the related object i and the following position:

[Math. 16]

Position $\vec{x}_T + \vec{r}_i$

Here the force may be represented by, for example, Expression 5:

[Math. 17]

$$\vec{F} = k_i(\vec{x}_i - (\vec{x}_T + \vec{r}_i)) \quad \text{Expression 5}$$

Here $k_i$ is a parameter which depends on the relatedness between the related object i and the selected object T ($k_i > 0$).

Then, as another example, the degree of relatedness between a related object and the selected object may be defined, using a physical parameter composed of a combination of (i) a velocity at which the related object is attracted to the selected object and (ii) the final position (relative position) of the related object with respect to the selected object.

Here the related object i comes closer to the following position:

[Math. 18]

Position $\vec{x}_T + \vec{r}_i$

Here suppose the related object i comes closer to the following position at a certain velocity:

[Math. 19]

Position $\vec{x}_T + \vec{r}_i$

The velocity can be calculated by, for example, the following Expression 6:

[Math. 20]

$$\vec{x}_i(t) = \vec{x}_i(t - \Delta t) + \frac{\vec{x}_i(t - \Delta t) - \{\vec{x}_T(t - \Delta t) + \vec{r}_i\}}{l_i} \quad \text{Expression 6}$$

Here the following Math. 21 represents a position of the related object i at the time t:

[Math. 21]

$$\vec{x}_i(t)$$

The following Math. 22 represents the position of the selected object T:

[Math. 22]

$$\vec{x}_T(t)$$

Furthermore, $I_i$ is a parameter which depends on the relationship (degree of relatedness) between the related object i and the selected object T($I_i$>0).

Described next is how the categorizing apparatus and the categorizing method assign and use a parameter which defines the tracking property that depends on the relationship between a related object and the selected object.

FIG. 1 exemplifies a display screen 22 according to the embodiment.

The display screen 22 in FIG. 1 also works as a user interface which is operable through touch control. Hereinafter the display screen 22 is assumed to have multiple regions on which the user can interact using touch gestures. It is noted that the display screen 22 is operable through touch control. As a matter of course, the display screen 22 may accept another kind of user interaction. For example, the user may control the display screen 22, using a computer device operated with a mouse or a stylus.

FIG. 1 exemplifies the case where the display screen 22 is used for managing image digital content such as photo library digital content. As a matter of course, the digital content to be managed in the embodiment shall not be limited to the image digital content. The digital content may be multiple objects to be displayed on the display screen 22, such as image digital content, text digital content, hypertext digital content, database digital content, and icons.

Figure 2:
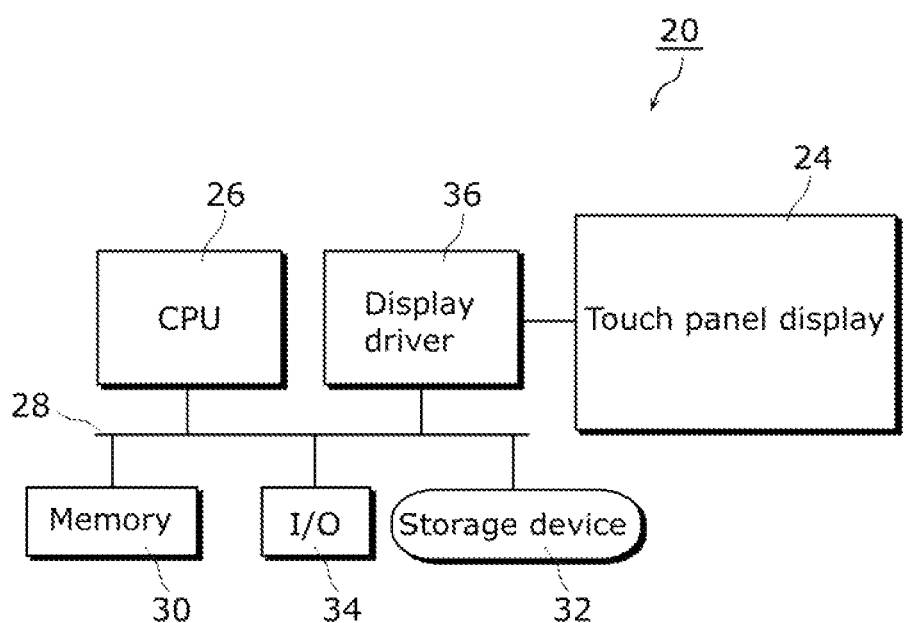
FIG. 2 exemplifies the structure of a display device according to the embodiment.

FIG. 2 exemplifies the structure of a display device 20 according to the embodiment.

The display device 20 in FIG. 2 includes a touch panel display 24, a central processing unit (CPU) 26, a bus 28, a memory 30, a storage device 32, an input and output (I/O) 34, and a display driver 36. Connected to the bus 28 are the memory 30 and the storage device 32 that are random-accessible, and the CPU 26. The CPU 26 is a central processing unit which is connected to the bus 28. The I/O 34 is an input and output unit which is connected to the bus 28. The I/O 34 is capable of facilitating communications with an external device through any given appropriate schemes such as wired connection or wireless connection.

The display driver 36 is connected to the bus 28 and supports the touch panel display 24. For example, the display driver 36 includes a circuit. This circuit is necessary for causing the display device 20 to drive and for receiving a touch input command produced when the user gives a touch gesture onto the touch panel display 24. On the display screen 22 in FIG. 1, for example, the display driver 36 support an operation, such as touch and drag, which allows the user to select an image digital content item.

It is noted that the display device 20 in FIG. 2 may either communicate with the categorizing apparatus described below via the I/O 34 or be included in the categorizing apparatus.

Figure 3:
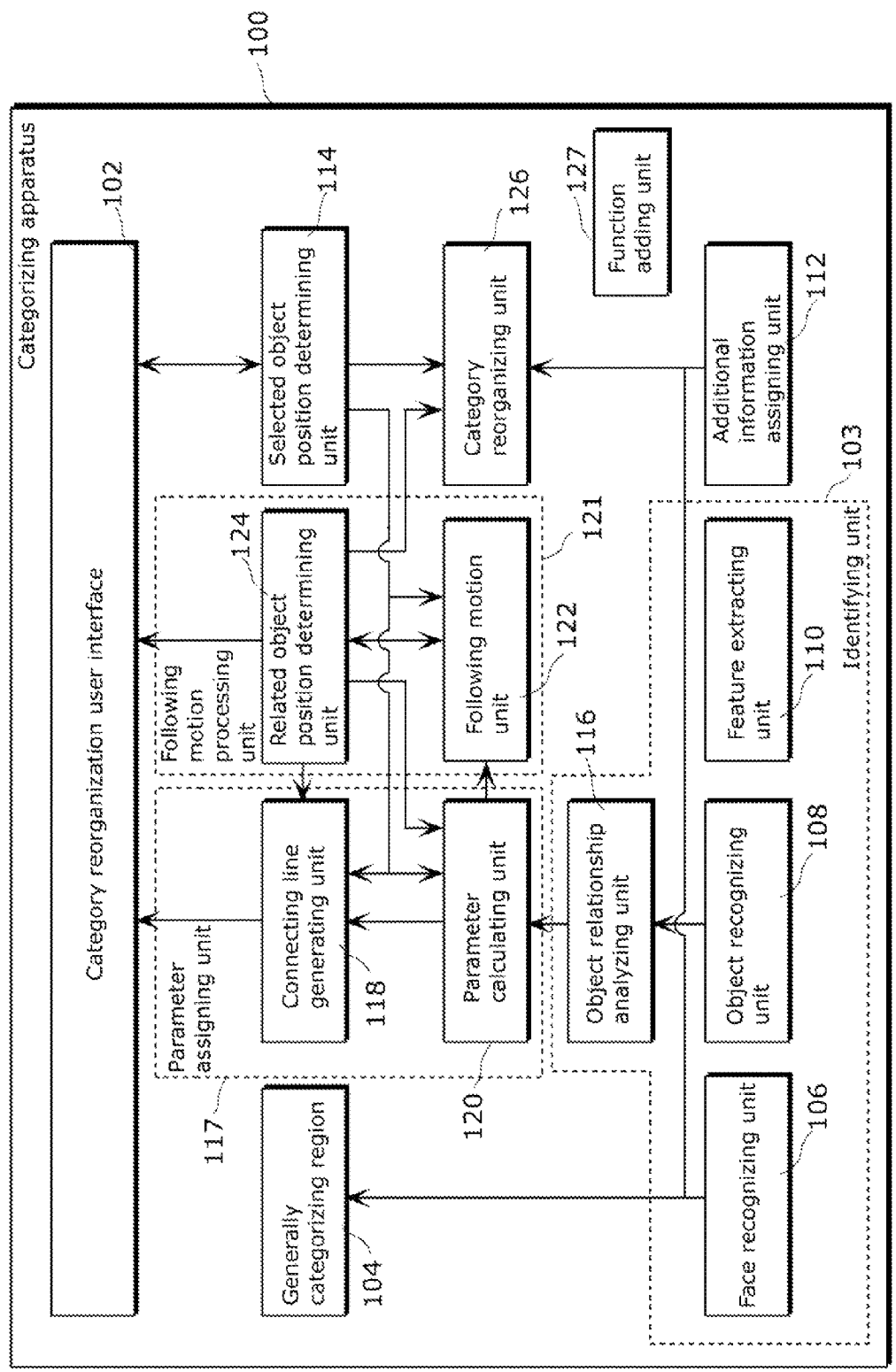
FIG. 3 depicts a block diagram which exemplifies the structure of a categorizing apparatus according to the embodiment.
Figure 4:
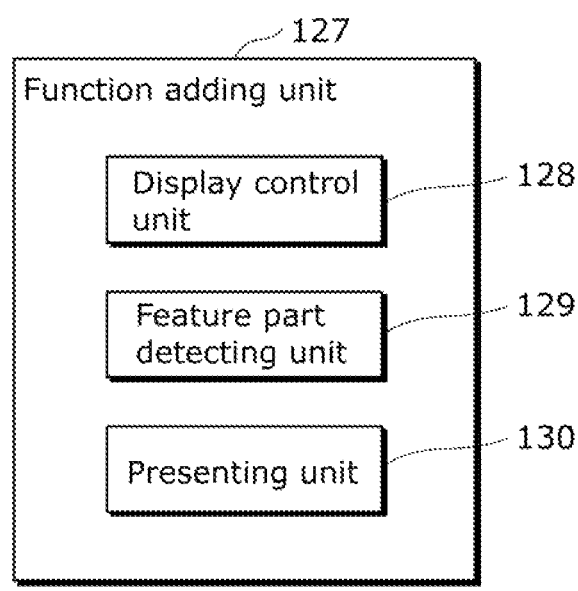
FIG. 4 depicts a block diagram which exemplifies in detail the structure of a function adding unit according to the embodiment.

FIG. 3 exemplifies the structure of a display device 100 according to the embodiment. FIG. 4 depicts a block diagram which exemplifies in detail the structure of a function adding unit 127 according to the embodiment. The categorizing apparatus 100 in FIG. 3 includes a category reorganization user interface 102, an identifying unit 103, a generally categorizing unit 104, a selected object position determining unit 114, a parameter assigning unit 117, an additional information assigning unit 112, a following motion processing unit 121, a category reorganizing unit 126, and the function adding unit 127.

The category reorganization user interface 102 is an interface unit which sequentially employs several software components to assist the interaction with the user, and to process the on-going interaction between the user and the display screen such as a display. In cooperating with the display device 20 in FIG. 20, the category reorganization user interface 102 assists the interaction with the user, exchanging communications with the I/O 34 of the display device 20.

The generally categorizing unit 104 cooperates with the identifying unit 103, and is activated without user's operation. Using a known automatic categorizing technique, the generally categorizing unit 104 generally and automatically categorizes multiple objects to be managed into different categories.

The identifying unit 103 includes a face recognizing unit 106, an object recognizing unit 108, a feature extracting unit 110, and an object relationship analyzing unit 116. The identifying unit 103 identifies, among multiple objects, one or more objects which are related to the selected object.

Typically, the objects are digital content items indicating the features of images and videos. The objects may also be icons to start up applications.

Using a known feature extracting technique, the feature extracting unit 110 extracts features included in objects such as images.

When multiple objects are digital content items such as photographs showing a person, the face recognizing unit 106 recognizes a region showing a face in the digital content items by analyzing each of the digital content items. For example, the face recognizing unit 106 recognizes an region showing a face, using an a suitable face recognition algorithm which detects a feature of a person's face, such as eyes, the nose, cheekbones, and the jaw, in the selected object (e.g. the object in the image) of the user's selection.

The object recognizing unit 108 recognizes, as the face recognizing unit 106 does so, a feature found in a target object. Here the face recognizing unit 106 is designed to recognize a feature to be identified as a person's face. In contrast, the object recognizing unit 108 is designed to recognize more general objects such as buildings, geographic features, and pieces of furniture. The face recognizing unit 106 and the object recognizing unit 108 may be implemented based on a learning system which is capable of learning by extracting features from known faces and known objects. It is noted the recognizing capabilities of that the face recognizing unit 106 and the object recognizing unit 108 rely on the general feature extracting capabilities of the feature extracting unit 110.

The face recognizing unit 106 and the object recognizing unit 108 are particularly suitable for visual image processing. These units are originally designed to serve general purposes. The units are also suitable for extracting any given creative features. Such features are not only the ones extracted from visual digital content (photographs and videos). The features are also applied to other kinds of data so that the features are applicable to more general purpose data mining applications.

The object relationship analyzing unit 116 cooperates with the selected object position determining unit 114 and the generally categorizing unit 104, and determines whether multiple objects in a first region are related to the selected object of the user's selection. The determination includes assigning a degree of relatedness to each of the related objects that are associated with the selected object. As the degree of relatedness, for example, a value may be assigned or a score of 0 to 100% may be assigned. It is noted that a score of 100% denotes that the related object is the same as the selected object or the related object and the selected object are very similar to each other. In contrast, a score of 0% denotes that the related object has no relationship with the selected object.

The selected object position determining unit 114 is an example of a position determining unit. The selected object position determining unit 114 determines a first position of an object selected by the user, in the first region, from among multiple objects arranged in the first region on the display screen. Specifically, the selected object position determining unit 114 sequentially determines the positions of selected objects of the user's selection.

The parameter assigning unit 117 includes a connecting line generating unit 118 and a parameter calculating unit 120. The parameter assigning unit 117 assigns a parameter to each of the one or more of the related objects according to the degree of relatedness between the related object and the selected object. Here the parameter is calculated by the parameter calculating unit 120, and contributes to a predetermined relationship which defines the tracking property of the related object to the selected object when the selected object is moved to the first position. Here the degree of relatedness is a degree of similarity between the selected object and the related object. The degree of relatedness may also be the degree of similarity between each of feature amounts for the selected object and the related object. The degree of relatedness may also be the degree of similarity between colors, between pixel values, and between motion vectors. For example, when the selected object and the related object include metadata which describes the feature of the object, the degree of relatedness may be the degree of similarity of the metadata. Moreover, when the selected object is an icon to start up an application, the degree of relatedness may be the degrees of similarity of the name of the application associated with the icon, the score of the kind of the application associated with the icon, and the score of the icon image as an image. Furthermore, the tracking property shows the characteristics of a following motion including a behavior which involves tracing a physical behavior.

It is noted that the parameter assigning unit 117 may assign the parameter, which contributes to the predetermined relationship, only to a related object which is included in related objects and has the first degree of relatedness or higher, according to the degree of relatedness between the selected object and each of the related objects.

The parameter calculating unit 120 calculates a parameter for each of the related objects. The parameter defines tracking property based on the degree of relatedness between the related object and the selected object. The parameter calculating unit 120 may also calculate a parameter (parameter for a predetermined relationship) as the tracking property. The parameter contributes to a predetermined relationship which defines an algorithm for simulating, according to the degree of relatedness, the behavior of an attractive force acting between the selected object and each of the related objects. Moreover, the parameter calculating unit 120 may also calculate a parameter (parameter for a predetermined relationship) as the tracking property. The parameter contributes to a predetermined relationship which defines an algorithm for simulating, according to the degree of relatedness, the behavior of a spring force that pulls each of the related objects towards the selected object. The parameter calculating unit 120 may further calculate a parameter (parameter for a predetermined relationship) as the tracking property. The parameter contributes to a predetermined relationship which defines an algorithm for simulating a frictional force which retards, according to the degree of relatedness, the behavior effected by the spring force.

Here the predetermined relationship is represented in a formula such as a predetermined function. The predetermined relationship may also be something other than the formula, such as a table which associates degrees of relatedness with various values. The predetermined function defines at least one of the position, velocity, and acceleration observed when an object moves. An example of such predetermined functions is a function which determines a physical phenomenon. Other than the example, the predetermined functions may be any given functions as far as they define curvilinear or linear behaviors of the object. It is noted that the embodiment hereinafter specifically exemplifies a relational expression which represents a force acting between the selected object and a related object, a relational expression which represents a velocity at which a related object is pulled to the selected object, and a relational expression which represents the final position (relative position) of a related object with respect to the selected object. As a matter of course, the relational expressions shall not be limited to the above ones.

The parameter calculating unit 120 calculates a physical parameter which treats each of the related objects as if it were connected by, for example, an invisible spring which produces a pulling force. Hence the parameter calculating unit 120 can define, to each of the related objects, characteristics (tracking property) which mimic a physical behavior. Here the characteristics are to cause the related objects to follow the selected object every time the user moves the selected object.

The connecting line generating unit 118 generates a connecting line between the selected object and each of the related objects. Then the connecting line generating unit 118 displays, based on the degree of relatedness, the generated connecting line in a visible form. Specifically the connecting line generating unit 118 generates the connecting line between the selected object and each of the related objects, based on the analysis result obtained from the object relationship analyzing unit 116. Here, based on the degrees of relatedness between the selected object and each of the related objects, the connecting line generating unit 118 may adjust the boldness or the color of the connecting lines to each of the related objects.

The additional information assigning unit 112 receives additional information to be inputted from the user to a group organized with the selected object at a second position and the related objects at the positions nearby the selected object. Then the additional information assigning unit 112 assigns the received additional information to the organized group.

Here the additional information includes, for example, a tag and metadata. Through the additional information assigning unit 112, the user may assign a tag to each of the objects that belong to the organized group. For example, in the case where the objects that belong to the organized group correspond to the face of the user's daughter, the user may assign the daughter's name as the additional information.

The category reorganizing unit 126 organizes the selected object at the second position and the related objects at the position nearby the selected object into a group in a new category (organized group). Specifically, the category reorganizing unit 126 organizes the selected object and the related objects into one organized group, and associates newly created recognition information with the organized group. This feature allows the user to recall the recognition information at a later time for adding additional information, such as a category name, to the organized group. Moreover, the user may use the objects forming the organized group as a starting point (selected object) in further reorganizing other objects.

The following motion processing unit 121 includes a following motion unit 122, and a related object position determining unit 124.

When the user moves the selected object from the first position to the second position included in a second region which differs from the first region on the display screen, the following motion unit 122 causes one or more related objects to follow the selected object and move each of the related objects to a position nearby the second position. Moreover, the following motion unit 122 causes a related object to follow the selected object, thereby the related object moving according to the parameter (predetermined relationship). Furthermore, the following motion unit 122 moves the related object to the position nearby the second position that is away the related object according to the degree of relatedness. For example, the following motion unit 122 causes multiple related objects to follow the selected object, thereby the selected object attracting the related objects using a force effected by a parameter which defines tracking property. The following motion unit 122 also moves the related objects to the positions nearby the second position, thereby each of the nearby positions keeping a distance from the second position according to the degree of relatedness.

Specifically, the following motion unit 122 causes the related objects to follow the selected object, using the parameter that defines tracking property according to the degree of relatedness between the selected object and each of the related objects, thereby each of the related objects tracing a physical behavior simulated by, for example, a tensile force or a spring force (showing a motion trajectory simulated by the tensile force and the spring force). More specifically, the following motion unit 122 provides a user-friendly and natural presentation of visual display by causing each of the related objects to generally follow the trajectory of the selected object, thereby each of the related objects tracing the physical motion.

Figure 5:
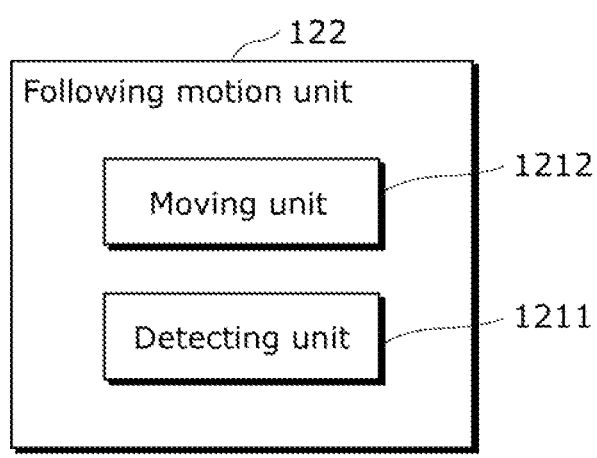
FIG. 5 depicts a block diagram which exemplifies structural elements that are included in a following motion unit according to the embodiment.

FIG. 5 depicts a block diagram which exemplifies structural elements that are included in the following motion unit 122 according to the embodiment. In other words, the following motion unit 122 may further include a detecting unit 1211 and a moving unit 1212. The detecting unit 1211 is an example of a rotation detecting unit or a velocity detecting unit. The detecting unit 1211 detects rotation applied to the selected object that the user moves from the first position to the second position. The detecting unit 1211 detects the velocity of the selected object when the user moves the selected object from the first position to the second position. In the case where the magnitude of the angular velocity of the rotation detected by the detecting unit 1211 is greater than or equal to a first threshold, the moving unit 1212 returns, to the original place in the first region, a related object which is included in the related objects and whose degree of relatedness is smaller than or equal to the first threshold. In the case where the magnitude of the velocity detected by the detecting unit 1211 is greater than or equal to a first threshold, the moving unit 1212 returns, to the original places in the first region, part of the related objects whose degrees of relatedness are smaller than or equal to the first threshold.

The related object position determining unit 124 determines a position of each of the related objects by defining a boundary between the related objects. For example, when the related objects follows the object, the related object position determining unit 124 determines the positions of the related objects based on the degrees of relatedness, thereby the related objects being positioned radially adjacent to the selected object. Here the related object position determining unit 124 determines where the related objects are repositioned so that the related objects do not overlap with each other.

The function adding unit 127 includes, for example, a display control unit 128, a feature part detecting unit 129, and a presenting unit 130 as shown in FIG. 4. Hence the function adding unit 127 provides additional functions to the categorizing apparatus 100. For example, the function adding unit 127 cooperates with the selected object position determining unit 114, and causes the selected object position determining unit 114 to determine a first position of a feature related object selected by the user, in the first region, from among the feature related objects. Here the feature related object is selected as the selected object.

The display control unit 128 displays on a third region an object which is designated by the user from among the multiple objects arranged in the first region. Here the third region differs from the first region and the second region. The feature part detecting unit 129 detects a first feature part which is designated by the user from among multiple feature parts that form the designated object displayed on the third area. The presenting unit 130 presents multiple feature related objects which are identified by the identifying unit 103 among the objects. Here the feature related objects has a relation to the first feature part.

The categorizing apparatus 100 is structured as described above.

Described hereinafter is how the categorizing apparatus 100 operates with reference to the display screen 22 in FIG. 1.

Figure 6:
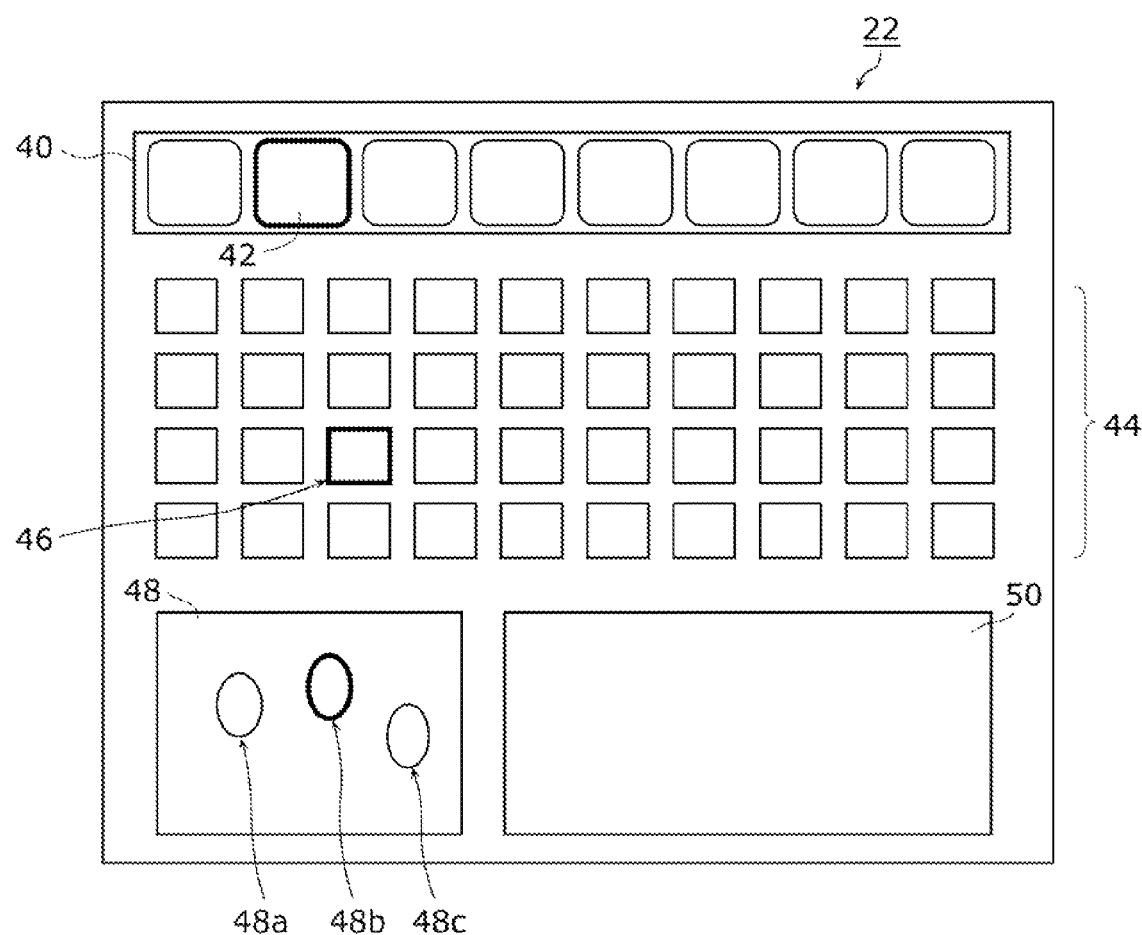
FIG. 6 exemplifies a display screen according to the embodiment.

FIG. 6 exemplifies a display screen according to the embodiment.

As shown in FIG. 6, the display screen 22 includes a generally categorizing region 40, a region 44, a window 48, and a region 50.

Suppose the display screen 22 arranges and displays multiple digital content items, such as photographs in a user's personal photo collection. Here the generally categorizing unit 104 categorizes the digital content items into various kinds or groups (category groups), using an automatic categorization technique. Then the categorizing apparatus 100 displays, on the generally categorizing region 40, thumbnail images and icons which show the generally categorized groups. The user can select, by a suitable touch gesture, a desired category group from among the category groups shown in the generally categorizing region 40. The example in FIG. 6 shows that the user selects a selection category 42.

When the user selects a desired category group in the generally categorizing region 40, the categorizing apparatus 100 displays, in the generally categorizing region 40, a thumbnail image or an icon representing multiple objects (digital content items) which belong to the selected category group (e.g. the selection category 42). Using a suitable touch gesture in the region 44, the user can select at least one object from among the objects shown in the region 44. FIG. 6 exemplifies the case where the user selects an object 46. Here the region 44 is an example of the first region.

The categorizing apparatus 100 displays the feature (e.g. an image of an enlarged selected object) of the object 46, selected by the user, on the window 48. Here the window 48 is an example of the third region, and the object 46 displayed in the window 48 is an example of the above designated object.

It is noted that the feature (designated object) of the object 46 displayed in the window 48 may include an identifiable sub-component. In other words, the object 46 displayed in the window 48 may include an individually-identifiable feature part, such as a building, a geographic feature, an animal, and a person's face. In FIG. 6, the window 48 shows the feature of the object 46, such as a photograph including three people's faces; namely, feature parts 48a through 48c. Here the function adding unit 127 has additional functions such as cooperating with the identifying unit 103 to search the identifiable feature parts for an additional related object and providing a feature related object which is associated with the feature parts.

For example, when the user uses a touch gesture to select one of the faces in the photograph displayed in the window 48, the function adding unit 127 initiates a query based on the selected person to retrieve and provide and the feature related object (e.g. another image showing the selected person). Furthermore, the object relationship analyzing unit 116 assigns a degree of relatedness. Here the degree of relatedness includes a score, such as a degree of similarity which is determined through an analysis of the degree of relatedness (similarity) between a selected feature part and the provided feature related object from among the multiple objects included in the selected category group. The object relationship analyzing unit 116 assigns a degree of similarity (score) to each of the provided images, based on, for example, the result of the recognition algorithms. An image showing the selected person receives a higher degree of relatedness. An image not showing the selected person receives a lower degree of relatedness.

As a matter of course, the algorithms for calculating the degrees of relatedness depend on the kind of objects to be analyzed. When an object to be analyzed is a digital content item such as photographic digital content and video digital content, the degrees of relatedness can be analyzed, using a face and object recognition algorithm and an image characteristic extraction technique. In the case where the object to be analyzed is an icon for starting up an application for a database, the degrees of relatedness can be analyzed, using a query technique.

Furthermore, the display screen 22 in FIG. 5 displays the region 50. The region 50 is used when the user reorganizes categories for the objects. Suppose the user selects an object (selected object) from among the objects included in a desired category group, and drags the selected object to the region 50. Then related objects follow the selected object, and the objects are moved to the region 50. It is noted that the following motion will be further described later, and the details thereof shall be omitted. Hence the user can perform such processing that the selected object and the related objects which follow the selected object to the region 50 are made into a family (organized group) included in a new category.

Figure 7A:
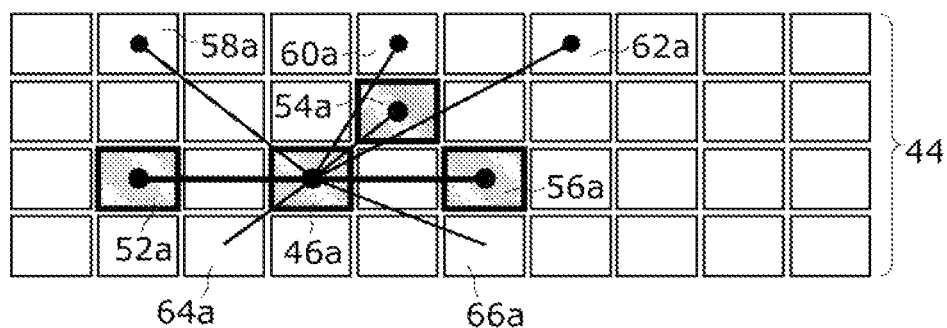
FIG. 7A shows following motion processing executed by the categorizing apparatus according to the embodiment.
Figure 7B:
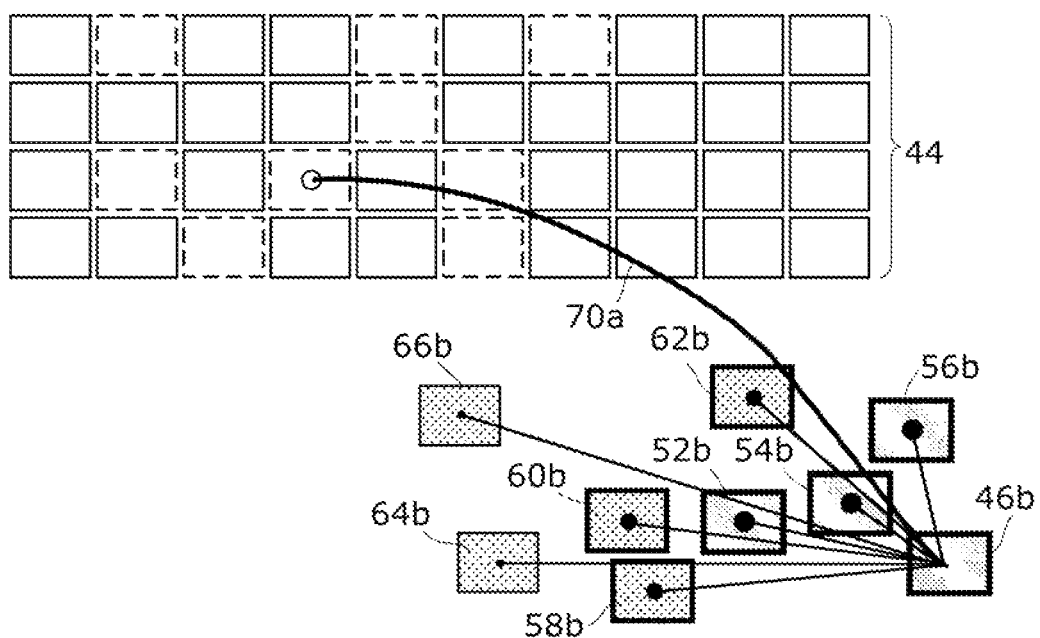
FIG. 7B shows how the categorizing apparatus according to the embodiment executes the following motion processing.

FIGS. 7A and 7B show following motion processing executed by the categorizing apparatus 100 according to the embodiment.

FIGS. 7A and 7B show a following motion observed when the user selects an object 46a from among multiple objects displayed in the region 44 and drags the selected object 46a (selected object) to a position out of the region 44 (e.g. a position in the region 50).

Specifically, first, when the user selects the object 46a in FIG. 7A, the categorizing apparatus 100, for example, highlights objects related to the object 46a. Here the categorizing apparatus 100 preferably highlights the related objects having a higher degree of similarity in a more prominent fashion. For example, the categorizing apparatus 100 may also highlight the related objects to make them visually perceptible to the user, as well as display connecting lines connoting the levels of connection, based on the degrees of relatedness. FIG. 7A exemplifies the case where objects 52a, 54a, and 56a are the related objects having a high degree of relatedness. In contrast, the related objects having a low degree of relatedness are depicted differently from the related objects having a high degree of relatedness, so that the former indicates the low degree of relatedness. Such a feature may include shading the related objects having the low degree of relatedness in a manner that the objects are in a more subdued fashion or may display connecting lines which are less prominent than those used for the related object that are highlighted and having the high degree of relatedness. FIG. 7A exemplifies the case where object 58a, 60a, and 62a are the related objects having a low degree of relatedness.

Specifically, as shown in FIG. 7A, the categorizing apparatus 100 visually depicts connecting lines using values indicating different boldness and brightness in order to show the degree of relatedness to be assigned to each of the related objects. For example, a related object having a degree of similarity (degree of relatedness) between 75% and 100% may be given a bold line, and a related object having a degree of similarity (degree of relatedness) between 50% and 74% may be given a less bold line. Then a related object having a degree of similarity (degree of relatedness) between 25% and 49% may be given a light line or a dotted line. Depending on the application, a related object having a degree of similarity (degree of relatedness) below a certain threshold, such as below 25% may be given no connecting line for visualization. The above features allow the user to visually recognize the degrees of relatedness. As an alternative to controlling the prominence or the boldness of the connecting lines, different colors may be used to show the levels of the degrees of relatedness.

Hence the categorizing apparatus 100 can display information indicating the degrees of relatedness assigned to the related objects, depending on various levels of the degrees of relatedness. In FIG. 7A, specifically, related objects; namely objects 64a and 66a, are shown with light shading. Such light shading allows the user to intuitively recognize that the related objects shown as the objects 64a and 66a have a degree of relatedness, to the selected object that is the object 46a, lower than the degrees of relatedness of the other related objects. It is noted that the technique to display the degrees of relatedness shall not be limited to the above example. In order to show low degrees of relatedness, for example, the connecting lines may be rendered with a lighter shade.

Then when the user drags the object 46a in FIG. 7A from its resting position as shown in FIG. 7B, the related objects follow a trajectory 70a of the object 46a. In FIG. 7B, the selected object (object 46a) is moved out of the region 44 to be an object 46b.

More specifically, when the user drags to move the selected object (object 46a), the related objects follow the trajectory 70 that is approximately the same trajectory as that of the selected object, and are spatially reorganized while following the selected object along the trajectory 70. In other words, the related objects having a high degree of relatedness as shown in FIG. 7B are placed closer to the object 46b; namely the moved selected object, than the related objects having a low degree of relatedness.

Here each of the related objects follows the selected object as if it were connected by an invisible spring having a spring force which is proportional to the corresponding degree of relatedness. Specifically, the related objects having a high degree of relatedness, such as objects 52b, 54b, and 56b, appear to be pulled toward the object 46b by an invisible spring force which is stronger than the invisible spring force for the related objects having a low degree of relatedness, such as object 58*b*, 60*b*, and 62*b*. In other words, FIG. 7A shows that both the related objects having a high degree of relatedness, such as the objects 52*a*, 54*a*, and 56*a* and the related objects having a low degree of relatedness, such as the objects 58*a*, 60*a*, and 62*a* are placed in dispersal to original positions in the region 44. In FIG. 7B, when each of the related objects follows the motion of the selected object by the user, however, the related objects are organized so that the order of the related objects is rearranged according to the degrees of relatedness (intensity of the degrees of relatedness).

It is noted that, in order to enhance the visual effect to the user, the categorizing apparatus 100 may buffer or temper the attractive force (invisible spring force) by adding a parameter which is sensitive to a moving velocity (velocity) of a related object following the target object so that the parameter reduces the attractive spring force. For example, such a parameter may be calculated to be sensitive to the following velocity. In order to create the sensitivity, each of the interconnecting lines between the selected object and the related objects may include a "dashpot" which affects the velocity. Here, the force acting upon each of the related objects may be expressed as $F=k\ dx/dt-c\ dv/dt$, employing the above parameter as a retarding force sensitive to both the spring force and the velocity.

The effect of the parameter represented by the retarding force is to slightly delay the following behavior of each of the related objects. In other words, thanks to the parameter, the behavior and the response to the invisible spring force are not instantaneous.

Hence the categorizing apparatus 100 can utilize the parameter to provide either the velocity-sensitive dashpot or a velocity-sensitive and behavior-resistant reaction force to each of the related objects, so that the related objects arrive at their final destinations after the selected object has stopped moving. Consequently, the categorizing apparatus 100 can give the visual effect to the user as if the behaviors of the related objects were affected by the velocities.

It is noted that the parameter may be expressed to the effect that each of the related objects are moving through a viscous medium. Here, even though the selected object (e.g. object 46*b*) changes its position, the related objects do not instantaneously follow the selected object or change their positions. Still, each of the related objects continues to coast to its new position for a short time after the selected object has already stopped.

Hence the categorizing apparatus 100 can use the parameter to cause the related objects to move toward the selected object though the viscous medium. Thus the categorizing apparatus 100 is capable of executing following motion processing for simulating, for example, an elastic string which stretches when the selected object is moved and keeps pulling the related objects toward the selected object after the selected object has stopped. Consequently, the categorizing apparatus 100 can give the visual effect to the user as if the related objects were pulled by the target object through the viscous medium.

Such a parameter makes it possible to retard the behaviors of the related objects following the selected object. Hence, when the related objects are moving to their final destinations, the user can see a related object, having a high degree of relatedness, outpacing a related object having a low degree of relatedness. Here, as described above, the invisible spring forces which attract the related objects are determined, based on the level (magnitude) of the degree of relatedness between the selected object and each of the related objects. Hence a related object having a higher degree of relatedness is attracted more quickly. Thus, when the selected object finally stops, the related object having a higher degree of relatedness is positioned closer to the selected object (disposed at a nearby position closer to the selected object).

It is noted that, in the above, all the objects related to the selected object follow the selected object; however, not all the related objects have to follow the selected object. Described hereinafter is how the related objects selectively follow the target object.

Suppose the detecting unit 1211 detects the velocity of the selected object when the user moves the selected object from the first position to the second position. In the case where the magnitude of the velocity detected by the detecting unit 1211 is equal to or greater than a first threshold, the moving unit 1212 may return, to the original places in the first region, part of the related objects whose degrees of relatedness are smaller than or equal to the first threshold. Hence the related objects may be attracted to the selected object, exhibiting motions showing complex and kinematic relationship.

Consequently, the user can control the total number of the related objects attracted while the selected object is moving, depending on how quickly the user moves the selected object. With reference to FIGS. 7A and 7B, when the user moves the object 46*a* slowly to the position where the object 46*b* indicates, even a related object having a low degree of relatedness follows the trajectory 70. In contrast, when the user moves the object 46*a* quickly to the position where the object 46*b* indicates, only the related object above a predetermined threshold (first threshold) follows the trajectory 70. The effect is that when the moving velocity of the selected object exceeds the predetermined threshold (first threshold), weaker interconnecting lines will be broken. As will be detailed later, the first threshold may be determined depending on the velocity. Hence the user can actually control the number of the related objects to be pulled out of the region 44, by simply controlling the moving velocity of the selected object.

Figure 8:
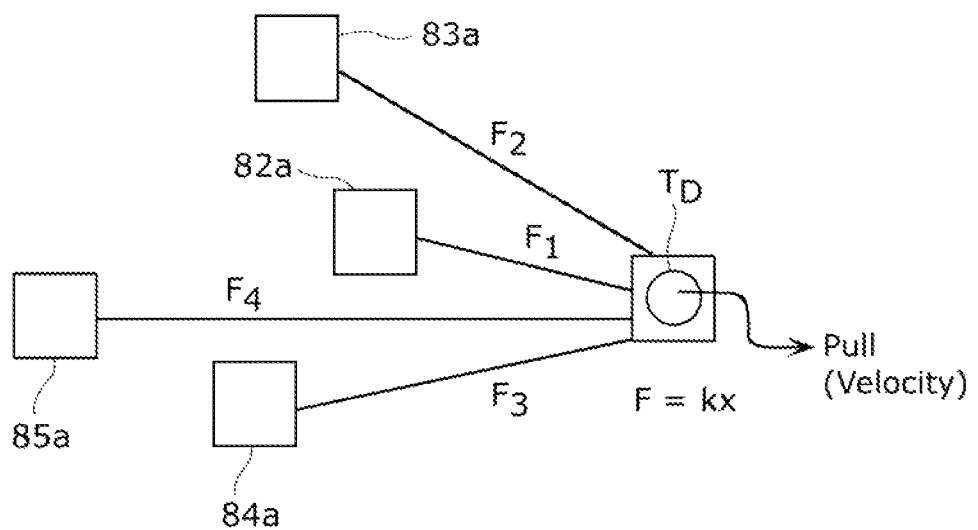
FIG. 8 illustrates a model which shows how to control the number of related objects which are following a selected object.

As described above, the user can control how many related objects are attracted to (captured by) the selected object by the velocity at which he or she moves the selected object. Specifically, the categorizing apparatus 100 assigns a parameter to define a frictional force indicating a behavior which acts opposite the direction at which each of the related objects is pulled. Hence the related objects are pulled across a frictional surface when they follow the selected object. Here the connecting lines indicating the tensile forces are set to be fragile (the connecting lines can stretch and break if the pulling force is excessively strong). In other words, a related object having a lower degree of relatedness has a more fragile connecting line. Due to such a feature, the related object having a lower degree of relatedness has the connecting line broken, depending on the velocity that the user moves the selected object. Accordingly, the related object having the broken connecting line will not be selected as a related object. FIG. 8 shows how such control will be accomplished.

FIG. 8 illustrates a model which shows how to control the number of related objects which are following the target object.

As shown in FIG. 8, the categorizing apparatus 100 assigns a physical parameter to each of the related objects. Here the physical parameter is calculated based on the level of the degree of relatedness. In other words, the categorizing apparatus 100 establishes a relationship between a physical parameter and a degree of similarity (degree of relatedness) which is observed between the selected object and a related object.

The assigned physical parameter exemplified in FIG. 8 defines a kinematic behavior such as the weight of an object, in a manner that a related object having a lower degree of relatedness (low similarity) receives a heavier weight, and a related object having a higher degree of relatedness (high similarity) receives a lighter weight. When the user pulls a selected object $T_D$ in a certain direction, the displayed objects 83a to 85a move. A related object having a heavier weight (e.g. 85a) moves slowly or does not move at all due to a defined frictional force (e.g. F4). In contrast, a related object having a lighter weight can move freely. Thus when the selected object $T_D$ moves, such a related object follows the selected object $T_D$ along with the trajectory of the selected object.

It is noted that FIG. 8 exemplifies the case where the frictional forces are assigned to the related objects based on the degrees of relatedness; however, the forces to be assigned to the related objects shall not be limited to the frictional forces. For example, a physical parameter, indicating a tensile force according to the degree of relatedness, may be assigned to each of the related objects. Here a related object having a low degree of relatedness (e.g. low similarity) receives a weak tensile force, and a related object having a high degree of relatedness receives a strong tensile force. Hence, the related objects receive a tensile force, based on their degrees of relatedness. Consequently, when the user pulls the selected object, a related object having a higher degree of relatedness is attracted more strongly to the selected object.

As another technique, each of the related objects may receive a connecting line having a fragility value depending on the degree of relatedness. In such a case, a related object having a low degree of relatedness (e.g. no similarity) receives a fragile connecting line, and a related object having a high degree of relatedness receives a not-fragile connecting line. Since each of the related objects receives a connecting line having a fragility value depending on the degree of relatedness, a connecting line having a lower fragility value is likely to be broken when the user pulls the selected object. In the technique, specifically, even though the user pulls the selected object $T_D$, the connecting line of a related object having a low degree of relatedness to the selected object will be broken (relatedness is broken). Consequently, the related object will not follow the selected object. For example, the connecting line denoted as F4 is shown in light color (thin line) to represent a low fragility value.

As a matter of course, the example in FIG. 8 may be replaced by another model.

Figure 9:
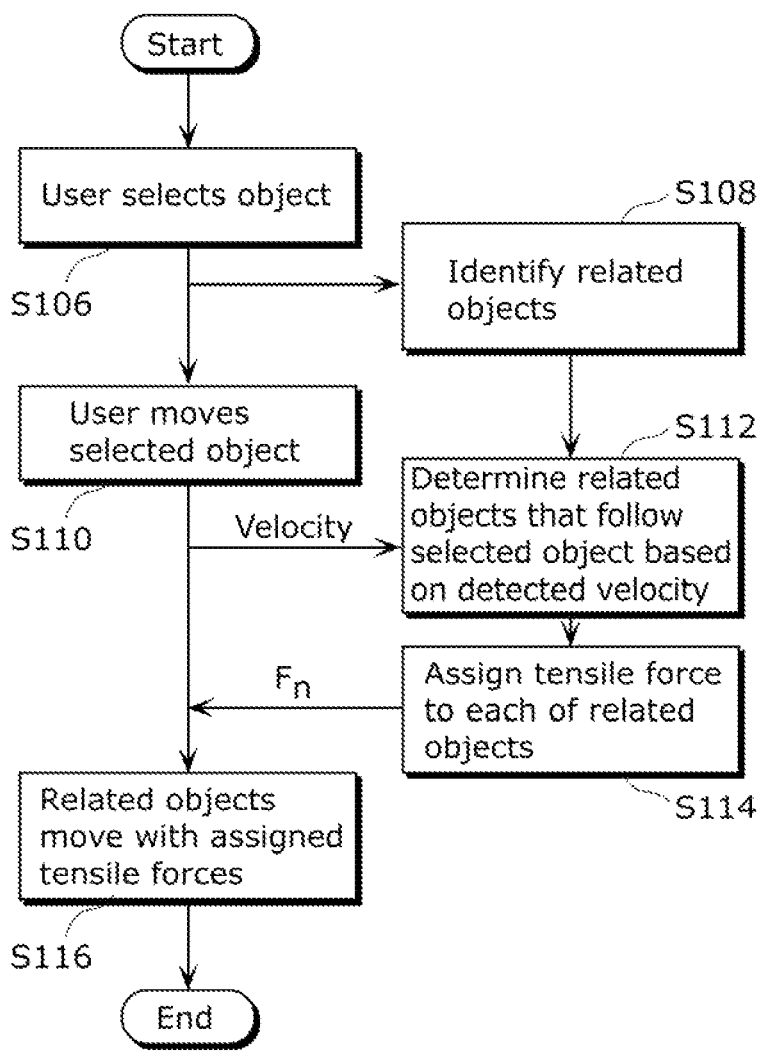
FIG. 9 depicts a flowchart which shows how the categorizing apparatus according to the embodiment assigns each of the related objects a tensile force based on a degree of relatedness of each of the related objects.

FIG. 9 depicts a flowchart which shows how the categorizing apparatus 100 according to the embodiment assigns a tensile force to each of the related objects based on a degree of relatedness of each of the related objects.

First, in Step S106, the user selects an object of his or her desire (selected object) from among multiple objects displayed in the region 44.

Then, in Step S108, the categorizing apparatus 100 identifies objects related to the selected object.

Next, in S110, the user moves the selected object from the region 44 to, for example, the region 50.

Here, in Step S112, the categorizing apparatus 100 detects the velocity at which the selected object is moved. Based on the detected velocity, the categorizing apparatus 100 determines the related objects that follow the behavior of the selected object. It is noted that the Step S112 corresponds to the setting of the velocity detailed in FIG. 8. In Step S114, the categorizing apparatus 100 calculates a physical parameter for defining, for example, a tensile force to each of the related objects, and assigns the calculated physical parameter to each of the related objects.

In Step S116, the categorizing apparatus 100 moves the related objects, using the assigned tensile forces Fn, so that the related objects follow the behavior of the selected object.

Figure 10:
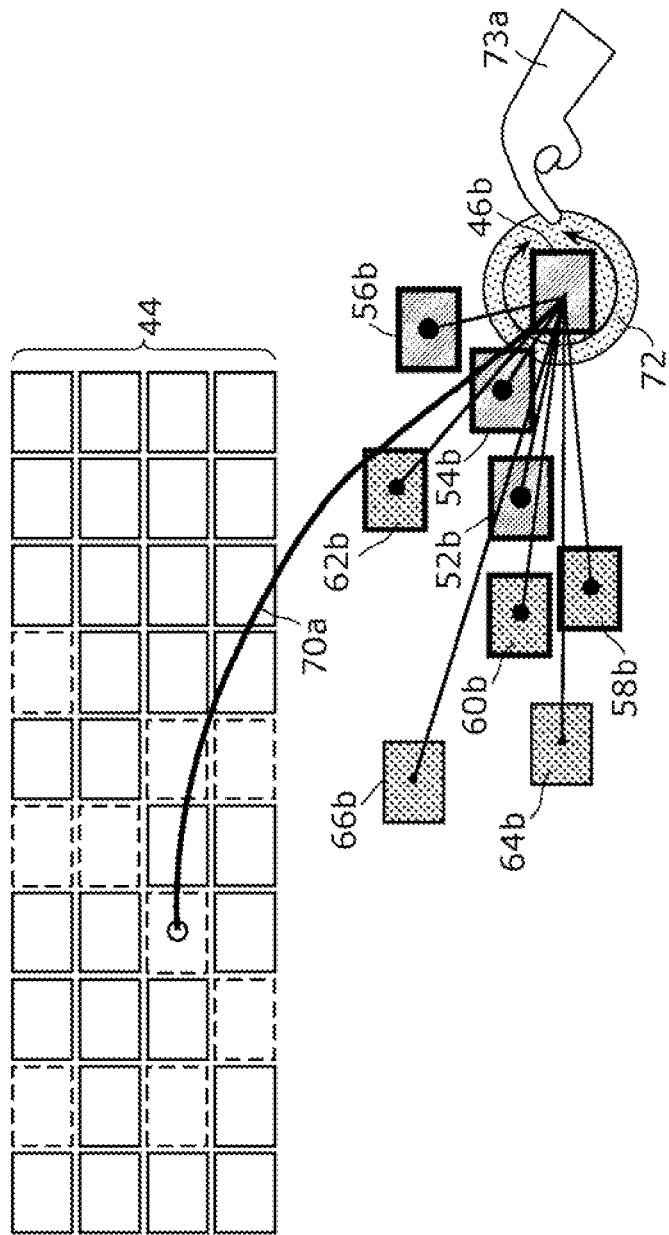
FIG. 10 illustrates another example which shows how the user controls the number of the related objects that are following the selected object.

FIG. 10 illustrates another example which shows how the user controls the number of the related objects that are following the selected object. The same constitutional elements between FIG. 7B and FIG. 10 share the same reference signs, and the details of such signs in FIG. 10 shall be omitted.

FIG. 10 shows that the user moves the once-moved selected object (e.g. object 46b) to control the extent of the degree of a relatedness with which a related object is attracted to the selected object.

Specifically, as shown in FIG. 10, the user carries out an operation 73a, such as a touch gesture, to rotate the object 46b clockwise. Thus the user can increase the number of the related objects. Furthermore, the user uses a touch gesture to rotate the object 46b counterclockwise. Thus the user can decrease the number of the related objects.

More specifically, when the user rotates a rotation control unit 72 clockwise or counterclockwise, the rotation control unit 72 generates the threshold of a value which fluctuates between high and low. The value generated by the rotation control unit 72 is used to set a threshold (first degree of relatedness), so that, based on the threshold, the categorizing apparatus 100 determines whether objects are related to the selected object. For example, when the user operates the rotation control unit 72 to set a high threshold, the only objects to be caught (attracted) as the related objects are the ones having a degree of similarity (degree of relatedness) of over 75%. In contrast, when the user operates the rotation control unit 72 to set a low threshold, for example, the only objects to be caught as the related objects are the ones having a degree of similarity (degree of relatedness) of over 25%.

It is noted that the operations are accomplished by the detecting unit 1211 and the moving unit 1212 both included in the following motion processing unit 121. Here the rotation detecting unit 1211 detects the rotation applied to the selected object that the user has moved from the first position to the second position. In the case where the magnitude of the angular velocity of the rotation detected by the detecting unit 1211 is greater than or equal to a first threshold, the moving unit 1212 returns, to the original place in the first region, part of the related objects whose degrees of relatedness are smaller than or equal to the first threshold.

Figure 11:
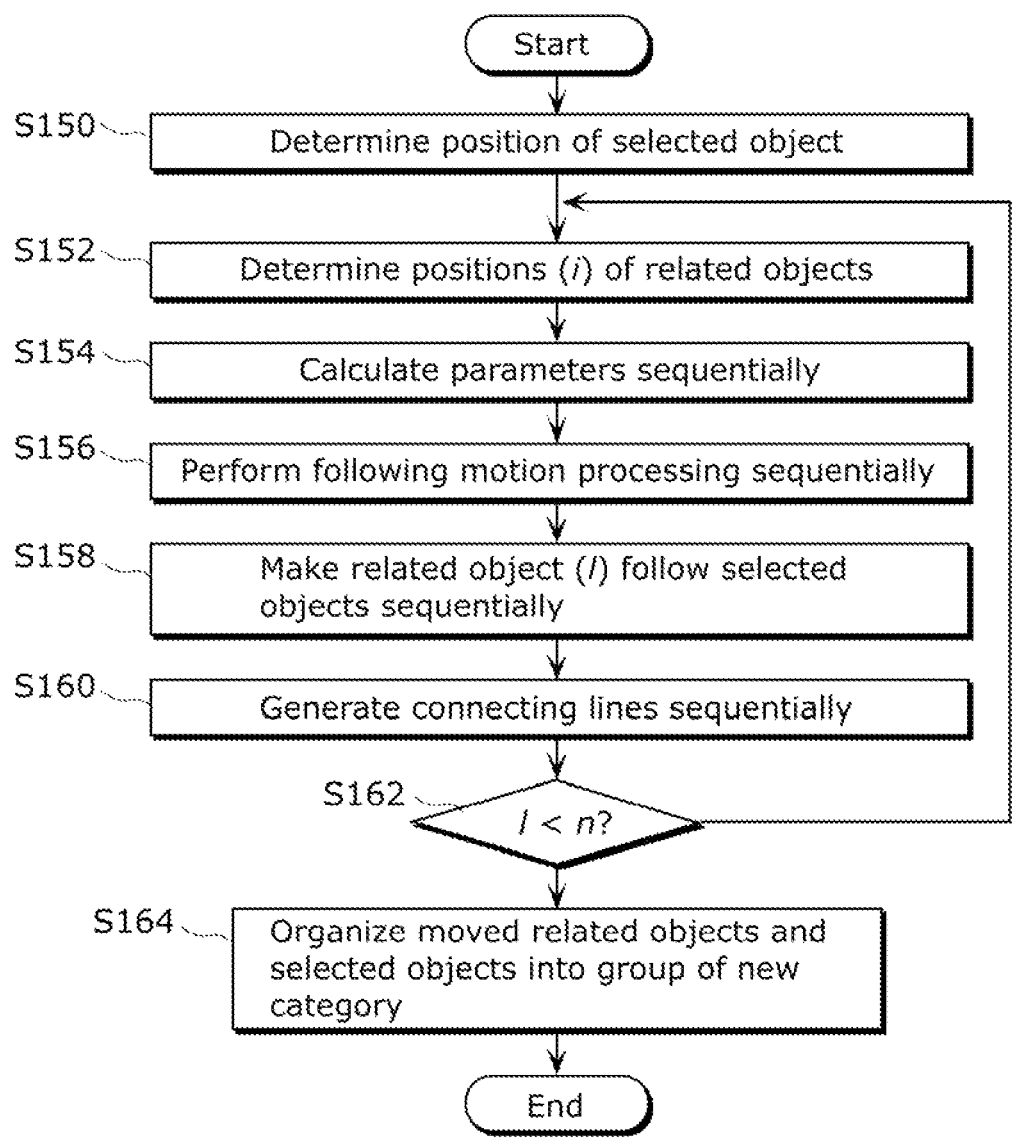
FIG. 11 depicts a flowchart which exemplifies processing executed by the categorizing apparatus according to the embodiment.

FIG. 11 depicts a flowchart which exemplifies processing executed by the categorizing apparatus 100 according to the embodiment. As described above, FIG. 11 exemplifies a technique to remap the selected object and the related objects following the selected object, and to reorganize the selected object and the related objects in a new category group.

First, in Step S150, the process determines the position of the selected object in the first region 44. The process is executed by the selected object position determining unit 114.

Then, in Step S152, the related digital content position determining unit 124 determines the position of each of the related objects, in the region 44, identified by the identifying unit 103. It is noted that the related digital content position determining unit 124 determines such positions in the order that the identifying unit 103 identifies the related objects.

Next, in Step S154, the parameter calculating unit 120 calculates a parameter for defining tracking property according to the degree of relatedness to the selected object, and assigns the calculated parameter to each of the related objects.

For example, the parameter calculating unit 120 sequentially calculates a tensile force (invisible spring force) for each of the related objects. It is noted that the tensile force can be calculated as a spring force according to the expression F=kx. Here k is proportional to a degree of relatedness between the related object and the selected object. When the user moves the selected object and the displacement (x) between the selected object and the related object changes, the tensile force becomes non-zero according to the linear relationship F=kx, and the tensile force is to be calculated. It is noted that each of the related objects may be separately processed to have a tensile force value based on a specific degree of relatedness.

It is noted that the tensile force may be calculated with an expression representing the above linear relationship; instead, the tensile force may be calculated with an expression representing a non-linear relationship implementing a different attractive force profile between the selected object and the related object.

In Step S154, the categorizing apparatus 100 calculates a following motion which determines how each of the related objects moves when the user moves the selected object.

For example, the behavior of the related object may be calculated, using the expression F=ma. Here m represents a standardized mass (which can be the same value for all the related objects), and a represents the acceleration generated by the force F. It is noted that since the mass of all related objects may be treated as equal, the applied force (the tensile force applied to each of the related objects) is proportional to the generated acceleration.

Hence, the execution of the following motion processing on each of the related object determines the acceleration value of the related object. The acceleration value is used for calculating the behavior of the related object. As a matter of course, such a behavior is a vector quantity. Specifically, the related object moves in a specific direction shown by a following motion model executed by the following motion unit 122. It is noted that the following motion model is simulated based on a kinematic relationship which shows that each of the related objects is attracted to the selected object by the invisible spring force (tensile force) provided between the selected object and each of the related objects. Consequently, the vector direction of the motion of the related object is directed toward the center of the selected object.

Next, in Steps S156 and S158, when the user moves the selected object, each of the related objects moves to follow the trajectory of the selected object as if the related objects were being attracted to the selected object.

It is noted that in order to give the related objects more realistic visual appearance (real-world appearance), resistance may be made to the motions of the related objects when instantaneous changes are found in the motions during the calculation of the following motions. In other words, the above-described physical parameter may be calculated to include a term which acts as the dashpot that is sensitive to the velocity. Such a feature allows the related objects to move as if they were immersed in a viscous medium. Furthermore, in calculating the following motion, the physical parameter is calculated to include a term which is sensitive to the velocity. Such a feature makes the behavior of each of the related objects slower than that of the selected object. In other words, when the user stops moving the selected object, each of the related objects continues to coast toward the final destination. The final destination is the point of the related object to be finally positioned where the tensile force returns to zero or where another already-positioned related object blocks the related object.

Next, in Step S160, the categorizing apparatus 100 generates a connecting line between the selected object and each of the related objects, as well as calculates the behavior of each of the related objects. Specifically, the categorizing apparatus 100 defines to depict the connecting line between the centers of the related objects (e.g. thumbnail images). It is noted that, as described above, the categorizing apparatus 100 generates the connecting line having the boldness and color adjusted based on the degree of relatedness.

Then, in Step S164, the categorizing apparatus 100 organizes the moved related objects and the selected object into a group in a new category. Here, the user may assign, to the organized group, a label showing the category.

It is noted that the categorizing apparatus 100 can associate additional information, which indicates at least one category tag or label, with each of the objects. Hence each of the objects may belong to at least one category.

Example

Exemplified hereinafter is how to use (use cases) the display screen 22 provided by the categorizing apparatus 100.

FIGS. 12 to 15 exemplify how to create a new category group on the display screen provided by the categorizing apparatus 100 according to the embodiment. The same constitutional elements between FIGS. 1 and 6 and FIGS. 12 to 15 share the same reference signs, and the details of such signs in FIGS. 12 to 15 shall be omitted.

Figure 12:
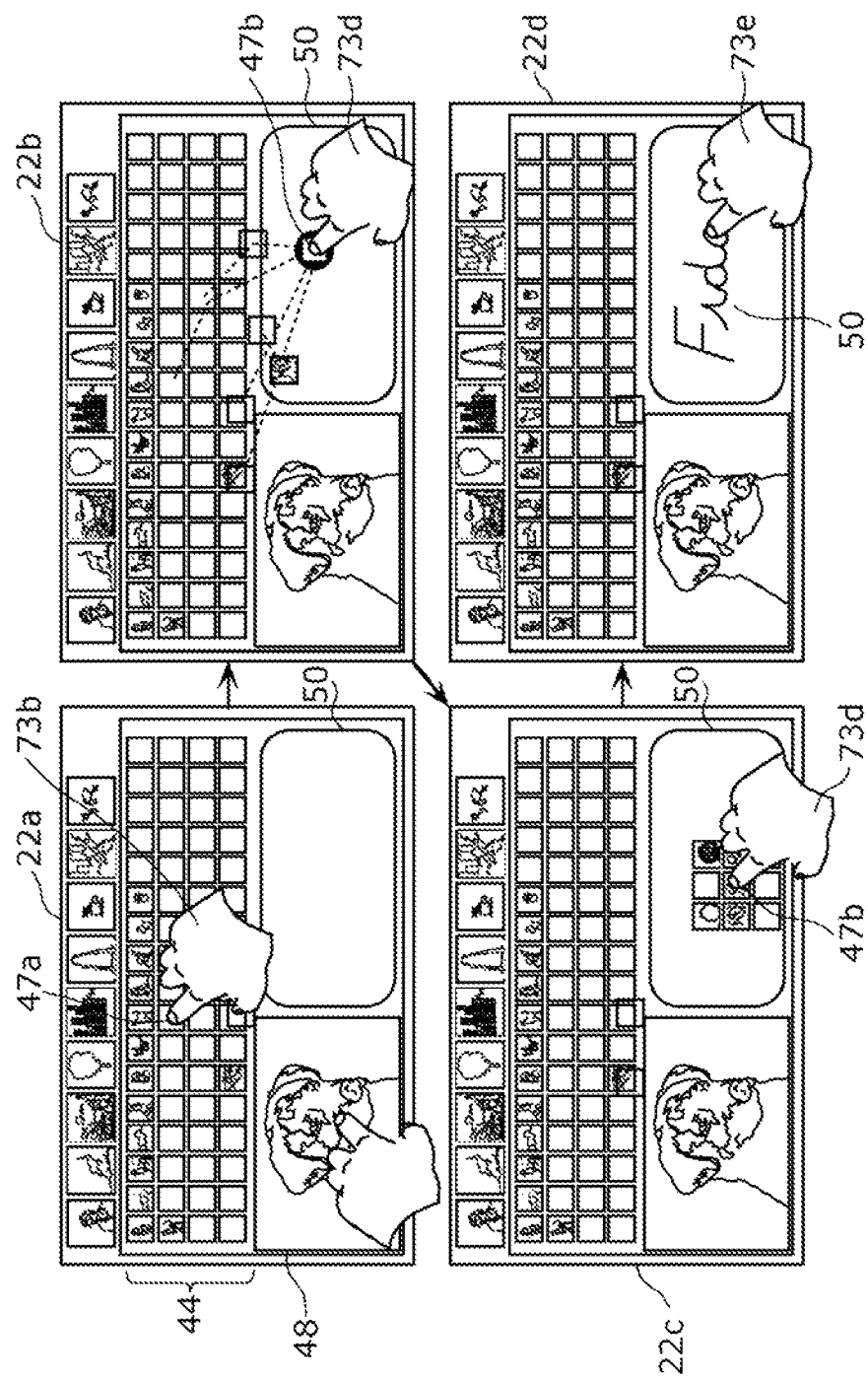
FIG. 12 exemplifies how to create a new category group on the display screen provided by the categorizing apparatus according to the embodiment.

Described below is a use case shown in FIG. 12. FIG. 12 exemplifies how the display screen 22 transits. First, the user carries out a touch gesture operation 73b on a transitional screen 22a to select an object 47a (selected object) from among multiple objects displayed on the region 44. Next, the user carries out a touch gesture operation 73d on a transitional screen 22b to drag the object 47a (selected object) from the region 44 to the position of an object 47b shown in the region 50. Then, as shown on a transitional screen 22e, the related objects are attracted to the positions nearby the object 47b. Then the user assigns a label [Fido] to a group of the attracted objects (the object 47b and the related objects nearby the object 47b) as a single organized group. It is noted that the labeled object group (objects which belong to the organized group) may be displayed as a new category group.

Described next is another use case shown in FIG. 13. FIG. 13 shows another typical use case as FIG. 12 shows. The user specifically selects on a transitional screen 22e part of the photograph showing the dog displayed in the window 48. In other words, the user carries out a touch gesture operation 73c on the transitional screen 22e to select part (e.g. dog itself) of an image 49d (designated object) including the dog displayed in the window 48. The selected part is used as a feature part to find another image showing the same dog. The subsequent processes are similar to those described above, and the details thereof shall be omitted.

Figure 14A:
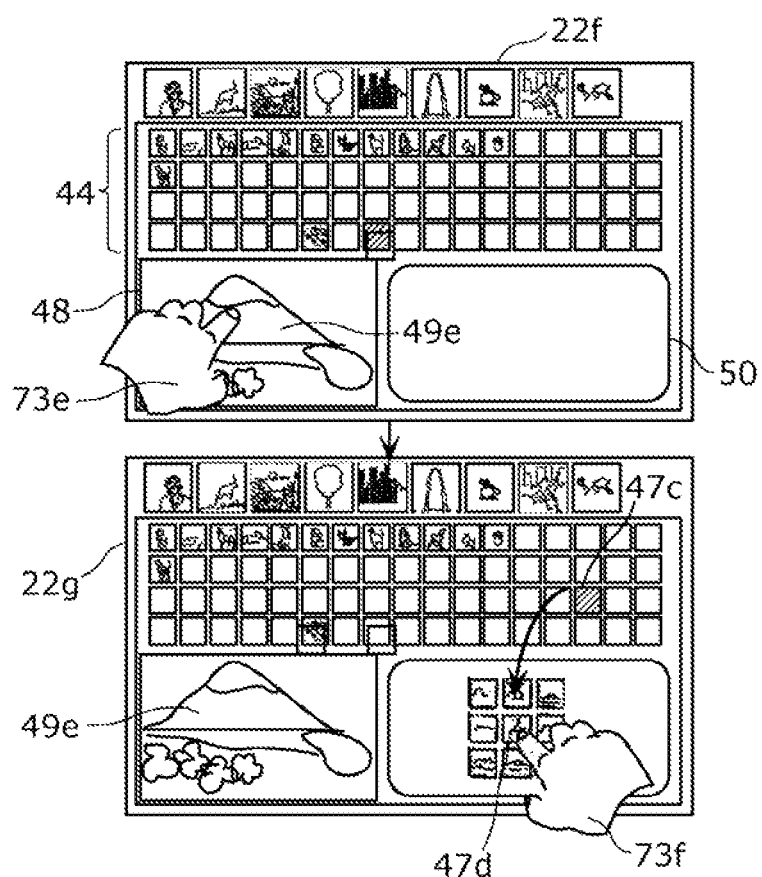
FIG. 14A exemplifies how to create a new category group on the display screen provided by the categorizing apparatus according to the embodiment.
Figure 14B:
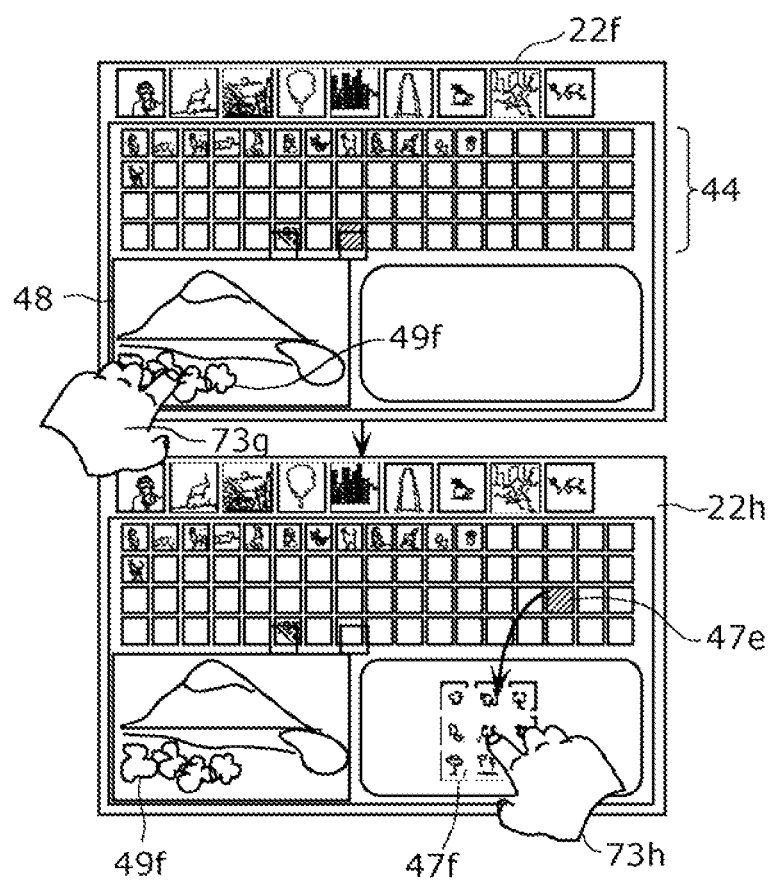
FIG. 14B exemplifies how to create a new category group on the display screen provided by the categorizing apparatus according to the embodiment.

Described next is another use case shown in FIGS. 14A and 14B. FIGS. 14A and 14B show a use case similar to that in FIG. 12. In FIGS. 14A and 14B, the user selects on a transitional screen 22f different feature parts in an image (designated object) displayed in the window 48.

In FIG. 14A, the user carries out a touch gesture operation 73e on a transitional screen 22f to select a Mt. Fuji 49e in the image displayed on the window 48. The user selects on a transitional screen 22g a related image (object 47c) including the Mt. Fuji 49e, and carries out a touch gesture operation 73f to move the related image from the region 44 to the positions of objects 47d in the region 50.

In FIG. 14B, in contrast, the user carries out a touch gesture operation 73g on the transitional screen 22f to select cherry blossoms 49f in the image displayed in the window 48. Then the user selects on a transitional screen 22h a related image (object 47e) including the cherry blossoms 49f, and carries out a touch gesture operation 73h to move the related image from the region 44 to the positions of objects 47f in the region 50.

Figure 15:
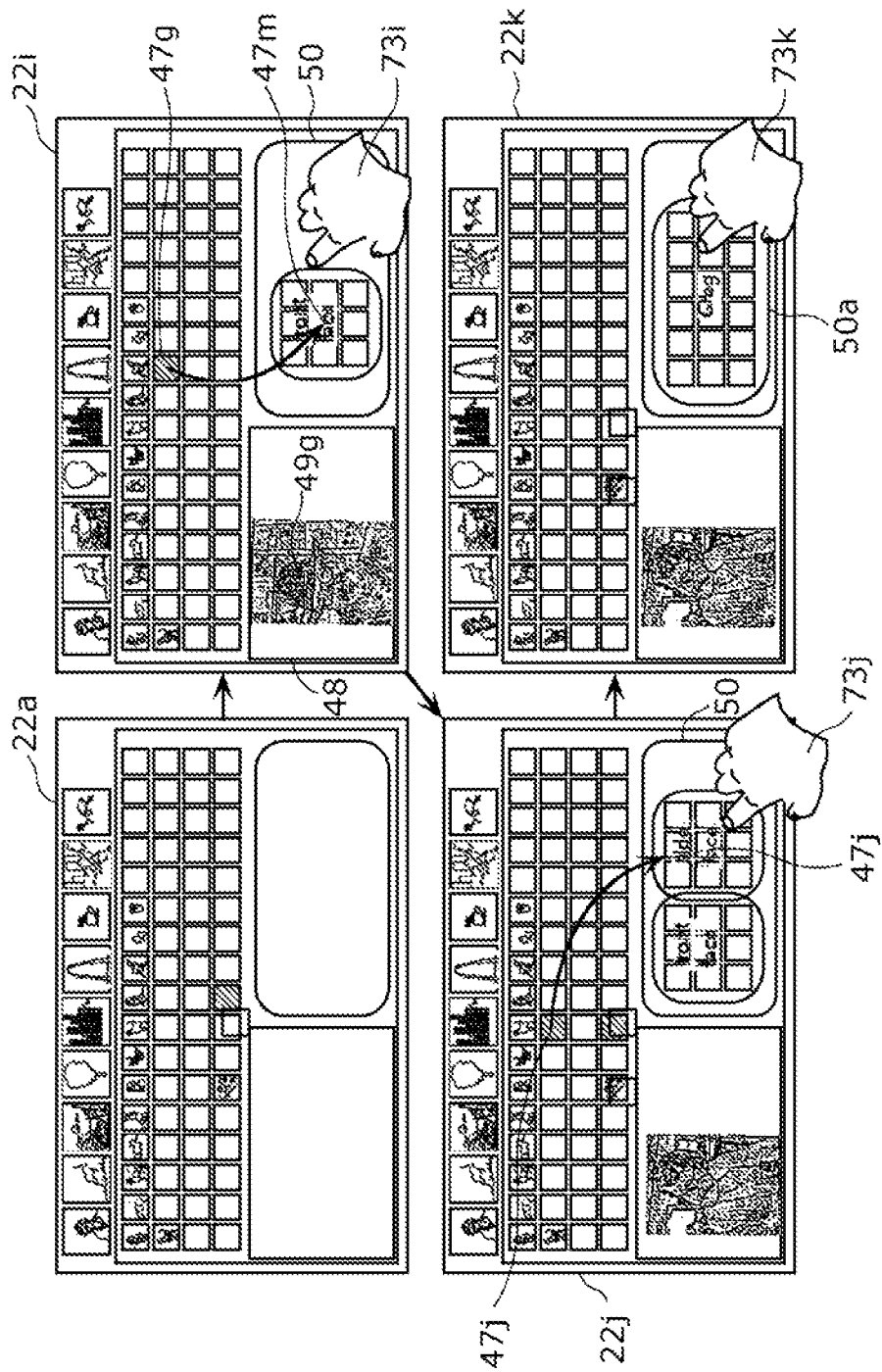
FIG. 15 exemplifies how to create a new category group on the display screen provided by the categorizing apparatus according to the embodiment.

Described next is another use case shown in FIG. 15. FIG. 15 shows the case where that, based on a previously-generated category, the user generates more complex category. First the user selects one of the images (objects) included in a previously-defined category (organized group). The selected image (object) is displayed in the window 48 as an enlarged image 49g. Next, in a transitional screen 22i, the user selects one person (not shown) included in the image 49g, and selects an object 47g of his or her desire from among the objects shown in the region 44 as the selected person. Then the user carries out a touch gesture operation 73i to move the object 47g from the region 44 to the position of an object 47m in the region 50. Hence a group of objects related to the object 47i is attracted to the region 50 as a new category. Next, on a transitional screen 22i, the user selects another feature part of the person selected in the image 49g. The user selects an object 47j of his or her desire from among the objects related to the feature part shown in the region 44. Then the user carries out a touch gesture operation 73j to move the object 47i from the region 44 to the position of an object 47j in the region 50. Hence a group of objects related to the object 47j is attracted to the region 50 as a new category. Next, on a transitional screen 22k, the user organizes the collected two object groups into one organized group 50a, and adds additional information to the organized group 50a. It is noted that the organized group 50a may include both the original category cluster and a newly generated category cluster. Two new organized groups may be merged into a single organized group.

Hence the embodiment implements the categorizing apparatus which allows the user to intuitively categorize digital content items through his or her operation, so that the digital content items are categorized as the user desires.

Described hereinafter are modifications of the present invention.

Modification 1

Figure 16A:
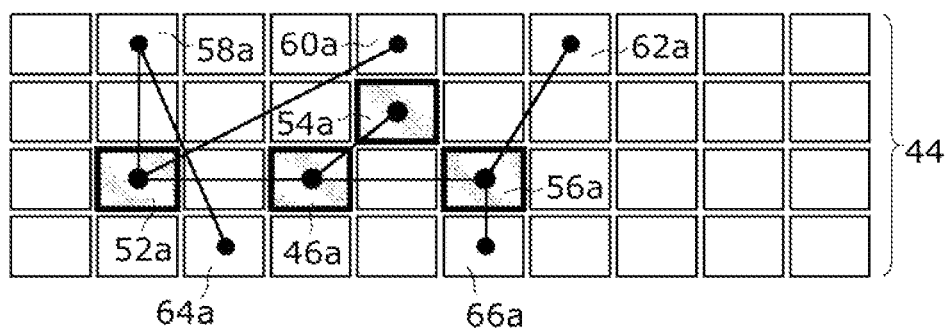
FIG. 16A shows following motion processing executed by the categorizing apparatus in Modification 1 according to the embodiment.
Figure 16B:
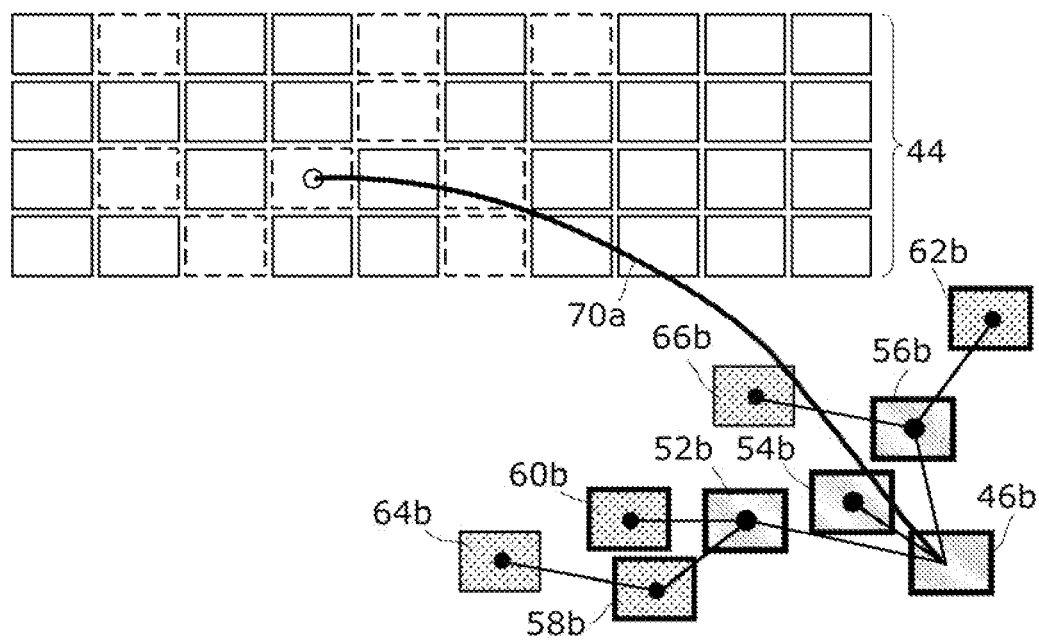
FIG. 16B shows following motion processing executed by the categorizing apparatus in Modification 1 according to the embodiment.

FIGS. 16A and 16B show following motion processing executed by a categorizing apparatus in Modification 1 according to the embodiment. The same constitutional elements between FIGS. 7A and 7B and FIGS. 16A and 16B share the same reference signs, and the details of such signs in FIGS. 16A and 16B shall be omitted.

As shown in FIG. 16B, the objects related to the selected object (object 56a) may be organized according to a tree structure.

Specifically the related objects, such as the objects 52a, 54a, and 56a, may be directly attracted to the selected object (object 46a). Moreover, for example, the related objects, such as the objects 58a, 60a, 62a, 64a, and 66a, may be directly attracted as grandchildren of the related objects.

Specifically, in FIG. 16A, the user selects the object 46a as the selected object, and moves the selected object 46a to the position of the object 46b along the trajectory 70 as shown in FIG. 16B. Here the objects 52a, 54a, and 56a are directly provided with a connecting line since these objects have a high degree of relatedness (similarity) to the object 46a. Similarly, each of the related objects (children) directly provided with the connecting line has a degree of relatedness to another object. The degrees of relatedness of the children are employed to define a parent-child-grandchild tree structure. The example in FIG. 16A shows that the object 52a is similar to the object 58a. Thus, when the object 46a moves to the position of the object 46b along the trajectory 70, the objects 58a and 64-a child and a grandchild of the object 52, respectively—move to follow the object 46a. As a result, the objects 52a, 58a, and 64a are attracted to the positions of objects 52b, 58b, and 64b.

It is noted that the operation is achieved when the identifying unit 103 identifies, among the objects, a first related object and a second related object as the related objects. Here the first related object relates to the selected object, and the second related object relates to the first related object.

Figure 17:
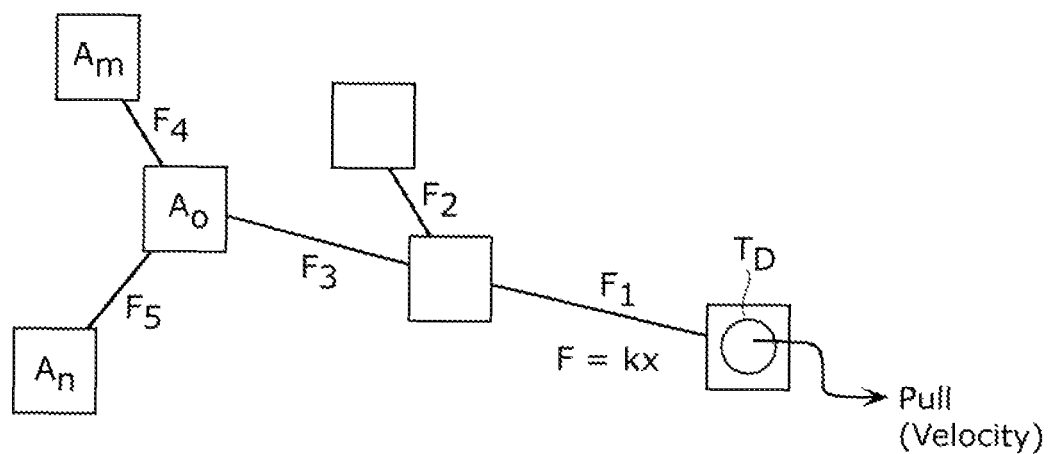
FIG. 17 illustrates a model which implements the control illustrated in FIGS. 16A and 16B.

FIG. 17 illustrates a model which implements the control illustrated in FIGS. 16A and 16B. The same constitutional elements between FIG. 8 and FIG. 17 share the same reference signs, and the details of such signs in FIG. 17 shall be omitted. As FIG. 17 shows, in the categorizing apparatus 100, the objects are to be attracted (or pulled) to each other, and captured by an invisible tensile force between each of the objects. Specifically, an object Am is attracted to an object Ao by a force F4, and an object An is attracted to an object Ao by a force F5. In other words, the attractive force acts between each of two-most-closely-situated objects, and the objects are not necessarily attracted directly to a selected object $T_D$.

It is noted that, the model in FIG. 8 shows that all the forces are attracted to the same selected object $T_D$. In FIG. 17, the forces are calculated as shown in FIG. 8, except that, in FIG. 17, each of the objects has a parent, child, or grandchild relationship. Hence the calculation of the forces may be performed recursively according to the tree structure.

Figure 18:
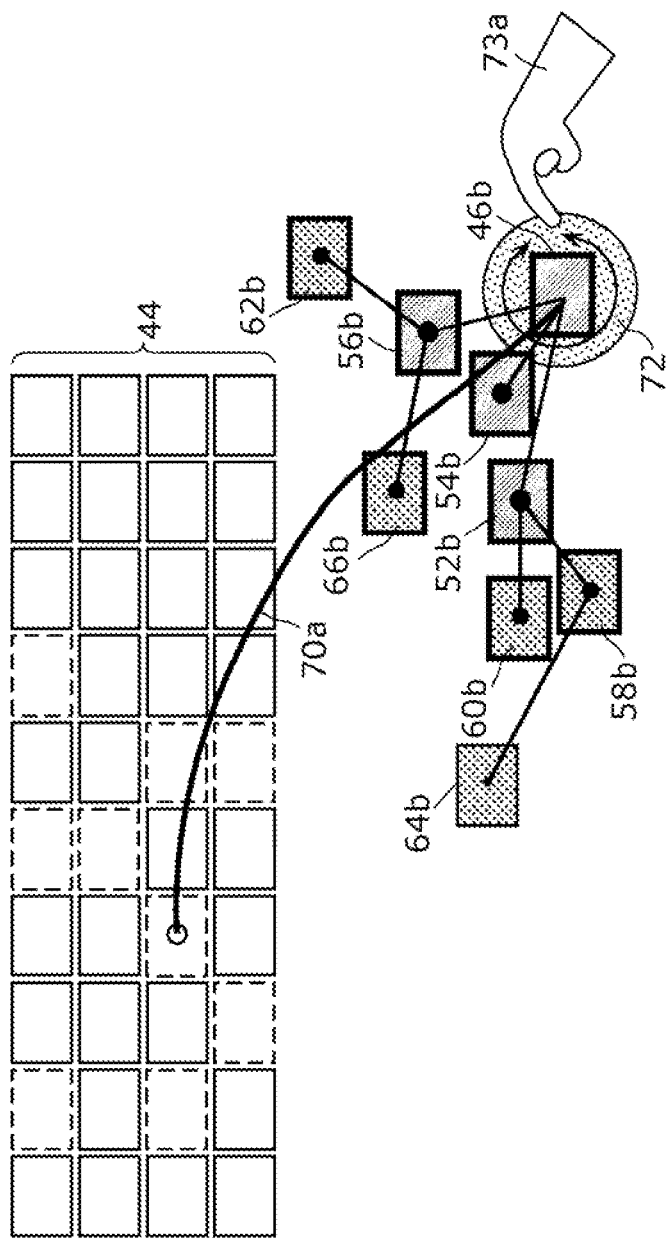
FIG. 18 illustrates an example which shows how the user controls the number of related objects that are following a selected object.

Here FIG. 18 illustrates an example which shows how the user controls the number of related objects that are following the target object. The same constitutional elements between FIG. 18 and FIGS. 10 and 16B share the same reference signs, and the details of such signs in FIG. 18 shall be omitted.

In other words, as shown in FIG. 10, the user may change the number of the related objects by rotating the object 46b with the operation 73a, such as a touch gesture, as FIG. 18 shows.

Modification 2

FIG. 19 shows following motion processing executed by the categorizing apparatus in Modification 2 according to the embodiment.

As shown in FIG. 19, for example, objects 46b, 46c, and 46d may be selected as selected objects, and objects related to the selected objects may be attracted to the selected objects (objects 46b to 46d).

Such an operation may be implemented as shown below. When the selected object includes multiple objects, the identifying unit 103 identifies, as the related objects, some of the objects which are related to the selected object having the average feature among the features of the selected objects.

Although only an exemplary embodiment of this invention has been described in detail above, those skilled in the art will readily appreciate that many modifications are possible in the exemplary embodiment without materially departing from the novel teachings and advantages of this invention. Accordingly, all such modifications are intended to be included within the scope of this invention.

For example, the above embodiment is exemplified to fully inform persons skilled in the art of the scope of the invention. In order for the persons skilled in the art to fully understand the features of the present invention, many specific features are exemplified, such as specific parts, devices, and techniques. It is noted that the persons skilled in the art do not have to use such specific features; instead, the persons skilled in the art may utilize the exemplified embodiment in various forms.

Thus it is clear for the persons skilled in the art that such features shall not be interpreted as the limitation on the scope of the disclosure. Moreover, the exemplified part of the Embodiment does not show the details of known steps, the structures of known devices, and known techniques.

It is noted that, in the above embodiment, each of the constitutional elements may be implemented in a form of dedicated hardware or through execution of a software program suitable to for each constitutional element. Each of the constitutional elements may be implemented in a form of a program executing unit, such as a CPU and a processor, which reads out to execute software program recorded on a recording medium including a hard disc or a semiconductor memory. Here the program below may be the software that works as the categorizing apparatus according to the embodiment.

The program causes a computer to execute: determining a first position of an object selected by a user, in a first region, from among objects arranged in the first region on a display screen; identifying, among the objects, one or more objects which are related to the selected object; and assigning a parameter to each of related objects, including the related object, according to a degree of relatedness between each of the one or more related objects and the selected object, the parameter contributing to a predetermined relationship which defines tracking property of the related object to the selected object when the selected object is moved from the first position.

INDUSTRIAL APPLICABILITY

The present invention may be used as a categorizing apparatus and a categorizing method. In particular, the present invention may be built into a cellular phone, a digital TV, an in-vehicle terminal, a touch panel display on which a user browses and checks information on the map.

REFERENCE SIGNS LIST

20 Display device
22 Display screen
22a, 22b, 22e, 22f, 22h, 22i, and 22k Transitional screen
24 Touch panel display
26 CPU
28 Bus
30 Memory
32 Storage device
34 I/O
36 Display driver
40 Generally categorizing region
42 Selection category
44 and 50 Region
46, 46a, 46b, 46c, 46d, 47a, 47b, 47c, 47d, 47e, 47f, 47i, 47j, 52a, 52b, 54a, 54b, 56a, 56b, 58a, 58b, 60a, 60b, 62a, 62b, 64a, 64b, and 66a Object
48 Window
48a, 48b, and 48c Feature part
49d Image
49e Mt. Fuji
49f Cherry blossoms
50a Organized group
70 Trajectory
72 Rotation control unit
73a Operation 73a
73b, 73c, 73d, 73e, 73f, 73h, 73i, and 73j Touch gesture operation
83a Object
100 Categorizing apparatus
102 Category reorganization user interface
103 Identifying unit
104 Generally categorizing region
106 Face recognizing unit
108 Object recognizing unit
110 Feature extracting unit
112 Additional information assigning unit
114 Selected object position determining unit
116 Object relationship analyzing unit
117 Parameter assigning unit
118 Connecting line generating unit
120 Parameter calculating unit
121 Following motion processing unit
122 Following motion unit
124 Related object position determining unit
126 Category reorganizing unit
127 Function adding unit
128 Display control unit
129 Feature part detecting unit
130 Presenting unit
1211 Detecting unit
1212 Moving unit

The invention claimed is:
1. A categorizing apparatus comprising:
a processor programmed in accordance with instructions stored in memory to determine a first position of a selected object selected by a user, in a first region, from among objects arranged in the first region on a display screen;
said processor being further programmed in accordance with instructions stored in memory to identify, among the objects, one or more related objects which are related to the selected object;
said processor being further programmed in accordance with instructions stored in memory to assign a parameter to each of the related objects, including the selected object, according to a degree of relatedness between each of the one or more related objects and the selected object, the parameter contributing to a predetermined relationship which defines a tracking property of each of the related objects to the selected object when the selected object is moved from the first position; and
said processor being further programmed in accordance with instructions stored in memory to cause, when the user moves the selected object from the first position to a second position, the related objects to follow the selected object and move the related objects to predetermined positions according to the degree of relatedness, the predetermined positions being set with the second position as an origin, and the second position being included in a second region that differs from the first region on the display screen,
wherein the selected object and the related objects are placed in dispersal in the first region without using the degree of relatedness, and
said processor is further programmed in accordance with instructions stored in memory to spatially reorganize and arrange the related objects at the predetermined positions when the user causes the related objects to follow the selected object to move to the predetermined positions,
said processor is further programmed in accordance with instructions stored in memory to detect a velocity of the selected object when the user moves the selected object from the first position to the second position; and said processor is further programmed in accordance with instructions stored in memory, in a case where a magnitude of the velocity detected is greater than or equal to a first threshold, to return, to an original place in the first region, a related object which is included in the related objects and whose degree of relatedness is equal to or smaller than the first threshold.

2. The categorizing apparatus according to claim 1, wherein the predetermined relationship is a function which defines at least one of position, velocity, and acceleration.

3. The categorizing apparatus according to claim 2, wherein the predetermined relationship defines, as the tracking property, an algorithm for simulating, according to the degree of relatedness, a behavior of an attractive force which acts between the selected object and each of the one or more related objects.

4. The categorizing apparatus according to claim 2, wherein the predetermined relationship defines, as the tracking property, an algorithm for simulating, according to the degree of relatedness, a behavior of a spring force which pulls each of the one or more related objects towards the selected object.

5. The categorizing apparatus according to claim 4, wherein the predetermined relationship further defines, as the tracking property, an algorithm for simulating a frictional force which retards, according to the degree of relatedness, the behavior effected by the spring force.

6. The categorizing apparatus according to claim 1, wherein said processor is further programmed in accordance with instructions stored in memory to move the remaining one or more related objects to a new position nearby the second position, wherein the new position is away from the second position according to the degree of relatedness.

7. The categorizing apparatus according to claim 1, wherein the degree of relatedness is a degree of similarity between the selected object and the one or more related objects.

8. The categorizing apparatus according to claim 1, further comprising
said processor being further programmed in accordance with instructions stored in memory to generate a connecting line between the selected object and each of the one or more related objects, and to display, based on the degree of relatedness, the generated connecting line in a visible form on the display screen.

9. The categorizing apparatus according to claim 1, wherein said processor is further programmed in accordance with instructions stored in memory to assign the parameter, which contributes to the predetermined relationship, only to a related object which is included in the one or more related objects and has a first degree of relatedness or higher, according to the degree of relatedness between the selected object and each of the one or more related objects.

10. The categorizing apparatus according to claim 1, further comprising:
said processor being further programmed in accordance with instructions stored in memory to display, on a third region, a designated object which is designated by the user from among the objects arranged in the first region, the third region being different from the first region and the second region;
said processor being further programmed in accordance with instructions stored in memory to detect a first feature part which is designated by the user from among feature parts that form the designated object displayed in the third region; and
said processor being further programmed in accordance with instructions stored in memory to present a first feature related object which is identified by the processor as being among the objects, and has a relation to the first feature part,
wherein said processor is further programmed in accordance with instructions stored in memory to determine a first position of a second feature related object selected by the user, in the first region, from among a plurality of feature related objects including the first feature related object, the second feature related object being selected as the selected object.

11. The categorizing apparatus according to claim 1, wherein the selected object includes two or more of the objects, and
said processor is further programmed in accordance with instructions stored in memory to identify, as the one or more related objects, objects which are related to one of the two or more of the objects that has an average feature among features of the two or more of the objects.

12. The categorizing apparatus according to claim 1, further comprising
said processor being further programmed in accordance with instructions stored in memory to receive additional information to be inputted from the user to a group organized with the selected object at the second position and the one or more related objects at the positions nearby the selected object, and to assign the received additional information to the organized group.

13. The categorizing apparatus according to claim 1, wherein said processor is further programmed in accordance with instructions stored in memory to identify, among the objects, a first related object and a second related object as the one or more related objects, the first related object relating to the selected object and the second related object relating to the first related object.

14. The categorizing apparatus according to claim 1, wherein the objects are icons to start up applications.

15. The categorizing apparatus according to claim 1, wherein the objects are content items.

16. A categorizing apparatus comprising:
a processor programmed in accordance with instructions stored in memory to determine a first position of an object selected by a user, in a first region, from among objects arranged in the first region on a display screen;
said processor being further programmed in accordance with instructions stored in memory to identify, among the objects, one or more objects which are related to the selected object;
said processor being further programmed in accordance with instructions stored in memory to assign a parameter to each of the one or more related objects, including the selected object, according to a degree of relatedness between each of the one or more related objects and the selected object, the parameter contributing to a predetermined relationship which defines a tracking property of each of the one or more related objects to the selected object when the selected object is moved from the first position; and
said processor being further programmed in accordance with instructions stored in memory to cause, when the user moves the selected object from the first position to a second position, the one or more related objects to follow the selected object and move the one or more related objects to predetermined positions according to the degree of relatedness, the predetermined positions being set with the second position as an origin, and the second position being included in a second region that differs from the first region on the display screen, wherein the selected object and the one or more related objects are placed in dispersal in the first region without using the degree of relatedness, and said processor being further programmed in accordance with instructions stored in memory to spatially reorganize and arrange the one or more related objects at the predetermined positions when the user causes the one or more related objects to follow the selected object to move to the predetermined positions, said processor is further programmed in accordance with instructions stored in memory to detect a rotation applied to the selected object that the user moves from the first position to the second position; and said processor is further programmed in accordance with instructions stored in memory, in a case where a magnitude of an angular velocity of the rotation detected is greater than or equal to a first threshold, to return, to an original place in the first region, a related object which is included in the one or more related objects and whose degree of relatedness is lower than or equal to the first threshold.

17. A categorizing method comprising:

determining a first position of an object selected by a user, in a first region, from among objects arranged in the first region on a display screen;

identifying, among the objects, one or more objects which are related to the selected object;

assigning a parameter to each of the one or more related objects, including the selected object, according to a degree of relatedness between each of the one or more related objects and the selected object, the parameter contributing to a predetermined relationship which defines a tracking property of the one or more related objects to the selected object when the selected object is moved from the first position;

causing, when the user moves the selected object from the first position to a second position, the one or more related objects to follow the selected object and move the one or more related objects to predetermined positions according to the degree of relatedness, the predetermined positions being set with the second position as an origin, and the second position being included in a second region that differs from the first region on the display screen, and detecting a velocity of the selected object when the user moves the selected object from the first position to the second position, and in a case where a magnitude of the velocity detected is greater than or equal to a first threshold, returning to an original place in the first region, a related object which is included in the one or more related objects and whose degree of relatedness is equal to or smaller than the first threshold, wherein the selected object and the one or more related objects are placed in dispersal in the first region without using the degree of relatedness, and the causing includes spatially reorganizing and arranging the related objects at the predetermined positions when the user causes the one or more related objects to follow the selected object to move to the predetermined positions.

18. A non-transitory computer-readable recording medium for use in a computer, the recording medium having a computer program recorded thereon for causing the computer to execute:

determining a first position of an object selected by a user, in a first region, from among objects arranged in the first region on a display screen;

identifying, among the objects, one or more objects which are related to the selected object;

assigning a parameter to each of the one or more related objects, including the selected object, according to a degree of relatedness between each of the one or more related objects and the selected object, the parameter contributing to a predetermined relationship which defines a tracking property of each of the one or more related objects to the selected object when the selected object is moved from the first position;

causing, when the user moves the selected object from the first position to a second position, the one or more related objects to follow the selected object and move the one or more related objects to predetermined positions according to the degree of relatedness, the predetermined positions being set with the second position as an origin, and the second position being included in a second region that differs from the first region on the display screen, and detecting a velocity of the selected object when the user moves the selected object from the first position to the second position, and in a case where a magnitude of the velocity detected is greater than or equal to a first threshold, returning to an original place in the first region, a related object which is included in the one or more related objects and whose degree of relatedness is equal to or smaller than the first threshold, wherein the selected object and the one or more related objects are placed in dispersal in the first region without using the degree of relatedness, and the causing includes spatially reorganizing and arranging the one or more related objects at the predetermined positions when the user causes the one or more related objects to follow the selected object to move to the predetermined positions.

* * * * *